(12) United States Patent
Hattori et al.

(10) Patent No.: US 9,011,750 B2
(45) Date of Patent: Apr. 21, 2015

(54) INJECTION MOLDING DEVICE AND METHOD FOR DISCHARGING HEAT MEDIUM FOR INJECTION MOLDING DEVICE

(75) Inventors: Michitaka Hattori, Nagoya (JP); Satoshi Imaeda, Nagoya (JP); Toshihiko Kariya, Nagoya (JP)

(73) Assignee: Mitsubishi Heavy Industries Plastic Technology Co., Ltd., Nagoya-shi (JP)

( * ) Notice: Subject to any disclaimer, the term of this patent is extended or adjusted under 35 U.S.C. 154(b) by 408 days.

(21) Appl. No.: 13/512,812

(22) PCT Filed: Apr. 21, 2010

(86) PCT No.: PCT/JP2010/002879
§ 371 (c)(1),
(2), (4) Date: May 30, 2012

(87) PCT Pub. No.: WO2011/132220
PCT Pub. Date: Oct. 27, 2011

(65) Prior Publication Data
US 2012/0241125 A1 Sep. 27, 2012

(51) Int. Cl.
*B29C 45/73* (2006.01)
*B29C 45/78* (2006.01)

(52) U.S. Cl.
CPC ......... *B29C 45/7306* (2013.01); *B29C 45/7312* (2013.01); *B29C 45/78* (2013.01); *B29C 2945/76006* (2013.01);
(Continued)

(58) Field of Classification Search
CPC ........... B29C 2945/76304; B29C 2945/76531; B29C 2945/76933; B29C 45/7306; B29C 45/7312; B29C 45/78
See application file for complete search history.

(56) References Cited

U.S. PATENT DOCUMENTS 6,991,756 B2  1/2006  Saeki et al.
7,527,756 B2  5/2009  Miyagawa et al.
(Continued)

FOREIGN PATENT DOCUMENTS

CN  101157267 A  4/2008
CN  101181818 A  5/2008
(Continued)

OTHER PUBLICATIONS

Electronic translation of Japanese Reference 2005-205876 issued Aug. 2005.*

(Continued)

*Primary Examiner* — Jill Heitbrink
(74) *Attorney, Agent, or Firm* — Westerman, Hattori, Daniels & Adrian, LLP

(57) ABSTRACT

The injection molding device of the present invention is provided with a supply pipe which supplies a heat medium to a mold, a discharge pipe which discharges the heat medium from the mold, a mold temperature adjustor to which the supply pipe and the discharge pipe are connected to adjust the temperature of the mold, and a discharge rate adjusting unit which is provided with a variable flow control valve installed on the discharge pipe to adjust a flow rate of the heat medium, a discharge pipe variable flow control valve bypass pipe for bypassing the variable flow control valve and a discharge pipe bypass on-off valve installed on the bypass pipe to change a flow rate of the heat medium and which is installed at a position upstream from the mold temperature adjustor on the discharge pipe.

19 Claims, 11 Drawing Sheets

(52) U.S. Cl.
CPC ............... *B29C 2945/76304* (2013.01); *B29C 2945/76531* (2013.01); *B29C 2945/76933* (2013.01)

(56) References Cited

U.S. PATENT DOCUMENTS

| | | |
|---|---|---|
| 2003/0085491 A1 | 5/2003 | Saeki et al. |
| 2005/0276880 A1 | 12/2005 | Saeki et al. |
| 2007/0184139 A1 | 8/2007 | Muranaka et al. |
| 2008/0111280 A1 | 5/2008 | Choe et al. |
| 2009/0053347 A1 | 2/2009 | Shimodo et al. |

FOREIGN PATENT DOCUMENTS

| | | | |
|---|---|---|---|
| CN | 101229678 A | | 7/2008 |
| EP | 1110692 | * | 6/2001 |
| JP | 62-179912 A | | 8/1987 |
| JP | 01-221205 A | | 9/1989 |
| JP | 01-259907 A | | 10/1989 |
| JP | 05-006490 B2 | | 1/1993 |
| JP | 2957139 B2 | | 10/1999 |
| JP | 2000-233411 A | | 8/2000 |
| JP | 2001-009839 A | | 1/2001 |
| JP | 2003-145542 A | | 5/2003 |
| JP | 2005-205876 A | | 8/2005 |
| JP | 2007-083502 A | | 4/2007 |
| JP | 2009-196088 A | | 9/2009 |
| JP | 2010-018020 A | | 1/2010 |
| JP | 2010-111022 A | | 5/2010 |
| TW | 466166 B | | 12/2001 |
| TW | 2007-22263 A | | 6/2007 |

OTHER PUBLICATIONS

Taiwanese Office Action dated Jan. 27, 2014, issued in corresponding Taiwanese application No. 100123600, w/ partial English translation (5 pages).
US Notice of Allowance dated Jul. 20, 2012, issued in U.S. Appl. No. 13/001,912.
International Search Report of PCT/JP2010/002879, mailing date of Jun. 1, 2010, w/ English machine translation.
International Search Report of PCT/JP2009/061870, mailing date of Oct. 6, 2009.
Written Opinion of PCT/JP2010/002879, mailing date Jun. 1, 2010.
Written Opinion of PCT/JP2009/061870, mailing date of Oct. 6, 2009.
Taiwanese Office Action dated Apr. 1, 2011, issued in corresponding Taiwanese Patent Application No. 098121686.
Taiwanese Notice of Allowance dated Sep. 27, 2011, issued in corresponding Taiwanese Patent Application No. 098121686.
US Notice of Allowance dated Aug. 5, 2011, issued in corresponding U.S. Appl. No. 13/001,912.
US Notice of Allowance dated Feb. 17, 2012, issued in corresponding U.S. Appl. No. 13/001,912.

* cited by examiner

INJECTION MOLDING DEVICE AND METHOD FOR DISCHARGING HEAT MEDIUM FOR INJECTION MOLDING DEVICE

TECHNICAL FIELD

The present invention relates to an injection molding device which heats a mold by supplying a heat medium and in particular to an injection molding device which controls the pressure of the heat medium during the second half of heating to adjust a temperature of the mold with high accuracy.

BACKGROUND ART

There has been conventionally proposed an injection molding device which supplies a heat medium such as steam to heat a mold, thereby increasing the temperature thereof to a target temperature (refer to FIG. 1 in Patent Document 1). In this injection molding device, an ordinary discharge line 13 is connected to a heat medium discharge port of a mold 1, and a steam trap 12 is installed on the ordinary discharge line 13. There is also installed an outlet bypass line 15 which bypasses the steam trap 12 and is communicatively connected to the upstream side and the downstream side of the ordinary discharge line 13. The outlet bypass line 15 is installed so as to bypass the ordinary discharge line 13, and a transfer valve 14 is installed on the outlet bypass line 15. Here, a discharge rate adjusting unit which is constituted with the steam trap 12, the outlet bypass line 15 and the transfer valve 14 is mounted on a mold temperature adjustor which is separately provided from the mold 1.

Then, in the above-constituted conventional injection molding device, during the first half of a heating step of the mold 1, the transfer valve 14 is opened to distribute steam in a large quantity into the mold 1, thereby rapidly heating the mold. On the other hand, during the second half of the heating step, the transfer valve 14 is closed to keep the inside of the mold 1 high in pressure by causing the steam to pass through the steam trap 12. In addition, the steam is controlled for pressure to adjust the temperature of the mold with high accuracy.

PRIOR ART DOCUMENTS

Patent Document

Patent Document 1: Japanese Published Unexamined Patent Application No. Hei-1-259907

SUMMARY OF THE INVENTION

Problems to be Solved by the Invention

However, in a conventional injection molding device, such a problem occurs that a heating rate is decreased during the second half of a heating step of a mold. More specifically, in recent years when an injection molding device is increased in size, such a tendency is found that a mold temperature adjustor equipped with a discharge rate adjusting unit is installed at a position away from the mold 1. In this case, the ordinary discharge line 13 extending from the mold 1 is increased in pipe length. Then, the increase in pipe length of the ordinary discharge line 13 as described above contributes to an increase in fluid pressure loss of a heat medium and also a decrease in pressure of the heat medium flowing into the mold. Further, the heat medium is decreased in pressure while flowing into the mold and being discharged from the mold, or heat release extent from the ordinary discharge line 13 to surrounding areas increased. Thereby, the heat medium is lowered in temperature, in particular, the heat medium closer to a discharge port inside the mold is lowered in temperature to reduce the heating effect. Thus, the mold is reduced in heating rate.

Further, where the mold temperature adjustor is provided with a cooling medium pipe, heat of a high-temperature heat medium at a discharge rate adjusting unit is deprived of heat by a cooling medium inside the cooling medium pipe to lower the temperature of the heat medium at the discharge rate adjusting unit. In addition, the mold-side heat medium which is on the upstream side is also lowered in temperature by heat conduction. As a result, the mold is reduced in heating rate.

Then, where a heat-medium supply source such as a boiler is not sufficiently capable of elevating a pressure of a heat medium to fail in sufficiently raising a temperature of the heat medium to be supplied up to a target temperature on heating the mold, a mold temperature in particular becomes closer to the target temperature on heating the mold. In addition, during the second half of a heating step when there is a small difference in temperature between the mold and the heat medium, the heat medium is lowered in temperature due to the above-described increase in fluid pressure loss and heat release, by which a difference in temperature is made smaller between the heat medium which is not sufficiently high in pressure (high in temperature) and the mold. In particular, a temperature of the heat medium closer to the discharge port inside the mold becomes approximate to the temperature of the mold, thus resulting in a greater reduction in the heating rate. Then, as described above, during the second half of the heating step, the heating rate is reduced to lengthen the time necessary for the mold to reach the target temperature.

The present invention has been made in view of the above situation, an object of which is to provide an injection molding device which is capable of preventing a mold from being reduced in heating rate during the second half of a heating step even where a mold temperature adjustor is installed at a position away from the mold.

Means for Solving the Problems (1) First means of the injection molding device is provided with a mold which forms a cavity space for injecting a resin, a supply pipe which supplies a heat medium to the mold, a discharge pipe which discharges the heat medium from the mold, a mold temperature adjustor to which the supply pipe and the discharge pipe are connected to control a flow rate or a pressure of the heat medium, thereby adjusting the temperature of the mold, and a discharge rate adjusting unit which has a variable flow control valve installed on the discharge pipe to adjust a flow rate of the heat medium and which is installed at a position upstream from the mold temperature adjustor on the discharge pipe.

According to the above-described constitution, the discharge rate adjusting unit is installed at a position which is upstream from the mold temperature adjustor on the discharge pipe. Therefore, as compared with a case where the discharge rate adjusting unit is mounted on the mold temperature adjustor, the discharge pipe in which the heat medium is sealed during the second half of a heating step of the mold is shortened in pipe length. Thus, since the sealed heat medium is smaller in quantity, (smaller in compressed distance of the heat medium), a pressure of the heat-medium supply source can be sufficiently transmitted to distal ends. Further, since the discharge pipe is small in heat release quantity to surrounding areas, there is no deterioration in the heating effect of the heat medium, and the heating rate of the mold is not reduced.

(2) Second means of the injection molding device is the above-described injection molding device (1) in which the discharge rate adjusting unit is further provided with a variable flow control valve bypass pipe which bypasses the variable flow control valve and is communicatively connected to the discharge pipe on the upstream side and the downstream side and a discharge pipe bypass on-off valve which is installed on the variable flow control valve bypass pipe. According to the above-described constitution, during the first half of heating in which a rapid heating with a early rising of the temperature is required, the heat medium is distributed not only into the variable flow control valve large in flow resistance but also into the variable flow control valve bypass pipe, by which the heat medium can be distributed in a large quantity into the mold to increase the heating rate of the mold.

(3) Third means of the injection molding device is the above-described injection molding device (2) in which the discharge rate adjusting unit is installed inside an injection molding machine.

According to the above-described constitution, the distance between the discharge rate adjusting unit and the mold can be shortened, and the discharge pipe in which the heat medium is sealed during the second half of a heating step of the mold can be shortened in pipe length. Therefore, the fluid pressure loss and the heat release quantity are maintained at the low levels, thus making it possible to suppress an influence due to a disturbance such as heat loss to surrounding areas and also prevent the mold from being reduced in heating rate. Further, the heating time can be made stable. Regarding a large-size injection molding machine having a large clearance in particular, the inside thereof can be used effectively to save space for installation of equipment. It is also possible to easily arrange and lay out the injection molding machine and peripheral equipment.

(4) Fourth means of the injection molding device is any one of the above-described injection molding devices (1) to (3) in which the discharge rate adjusting unit is installed at a side end of the discharge pipe connected to the mold.

According to the above-described constitution, since the discharge pipe in which the heat medium is sealed during the second half of the heating step of the mold is the shortest in pipe length, the fluid pressure loss and the heat release quantity are maintained at the lowest possible levels. Thereby, an influence due to a disturbance such as heat loss to surrounding areas can be suppressed to the lowest possible extent. The mold can be prevented from being reduced in heating rate as much as possible and also made stable in heating time.

(5) Fifth means of the injection molding device is any one of the above-described injection molding devices (2) to (4) in which the discharge rate adjusting unit is further provided with a steam trap which discharges only a liquid heat medium.

According to the above-described constitution, even where the discharge pipe is short in pipe length, the liquid heat medium is discharged without accumulating inside of the mold, by which the mold can be accurately controlled for temperature. Further, since no gas-liquid mixture is found inside the discharge pipe, it is possible to suppress vibration and shock resulting from cavitation, and so on, and prevent breakage of piping.

(6) Sixth means of the injection molding device is any one of the above-described injection molding devices (1) to (5) in which the mold is provided with a cavity side part and a movable side part, the discharge pipe is branched into a cavity-side discharge pipe connected to the cavity side part and a movable-side discharge pipe connected to the movable side part, and the discharge rate adjusting unit is installed on each of the cavity-side discharge pipe and the movable-side discharge pipe in the discharge pipe.

According to the above-described constitution, the discharge rate adjusting unit installed on the cavity-side discharge pipe is used to control a temperature of the cavity side part, while the discharge rate adjusting unit installed on the movable-side discharge pipe is used to control a temperature of the movable side part. It is, therefore, possible to control a temperature of the mold more accurately. Further, in particular, where there is a difference in thermal volume between the cavity side part and the movable side part and a heat medium is supplied to each of the cavity side part and the movable side part at the same flow rate, one of them smaller in thermal volume may be increased in the heating rate of the temperature and heated to an excessively high temperature. In order to cope with the above situation, the discharge rate adjusting unit of the mold installed on each of the discharge pipes is used to adjust the pressure and the flow rate of the heat medium supplied to each of the cavity side part and the movable side part, thereby controlling the temperature of the heat medium to be supplied thereto, respectively. Thereby, a difference in heat quantity is given to the cavity side part and the movable side part, thus making it possible to control the cavity side part and the movable side part so that they can reach a target temperature at substantially the same time.

(7) Seventh means of the injection molding device is any one of the above-described injection molding devices (1) to (5) in which the mold is provided with a cavity side part and a movable side part, the discharge pipe is provided with a cavity-side discharge pipe connected to the cavity side part, a movable-side discharge pipe connected to the movable side part and a junction pipe at which the cavity-side discharge pipe joins with the movable-side discharge pipe, and the discharge rate adjusting unit is installed on the junction pipe.

According to the above-described constitution, both the cavity side part and the movable side part can be controlled for temperatures by using one discharge rate adjusting unit. Therefore, it is possible to simplify temperature control of the mold and also reduce the cost of the discharge rate adjusting unit. Further, a small-size injection molding machine having a small clearance is also able to have a discharge rate adjusting unit so as to shorten the length of a discharge pipe. Still further, where installed outside an injection molding machine, the discharge rate adjusting unit can be installed in a small space.

(8) Eighth means of the method for discharging a heat medium in a prior step is that in which in any one of the above-described injection molding devices (1) to (7), at the same time when supply of a heat medium in a prior step is stopped, a heat-medium switching delay timer is actuated, by time-up which is indicated by the heat-medium switching delay timer or a signal of starting supply of a heat medium in a subsequent step corresponding to progress of injection steps, supply of the heat medium in the subsequent step is started, a mold bypass circuit is opened which has a mold bypass on-off valve installed on a mold bypass pipe which bypasses the mold to couple a supply-side junction pipe of the heat medium to a discharge-side junction pipe thereof, and a mold bypass circuit-blocking delay timer (T12) is actuated, at a point in time when the mold bypass circuit-blocking delay timer indicates that time is up or at a point in time when a heat-medium passage sensor (41) installed at a mold supply-side piping detects a heat medium in the next step, the mold bypass circuit is blocked. The term "progress of injection steps" used in the present invention not only means progress of injection and filling steps but also means progress of steps including cooling and solidification steps of a resin inside a mold cavity.

(9) Ninth means of the method for discharging a heat medium in a prior step is the above-described method for discharging a heat medium in a prior step (8) in which supply of a heat medium in a prior step is stopped by time-up which is indicated by a timer which is actuated from start of supplying the heat medium in the prior step and/or at a point in time when the temperature of the mold reaches a predetermined temperature.

(10) Tenth means of the method for discharging a heat medium in a prior step is the above-described method for discharging a heat medium in a prior step (8) or (9) in which the heat medium in a prior step is a heating medium, and the heat medium in a subsequent step is a cooling medium.

(11) Eleventh means of the method for discharging a heat medium in a prior step is the above-described method for discharging a heat medium in a prior step (8) or (9) in which the heat medium in a prior step is a cooling medium, and the heat medium in a subsequent step is a heating medium.

(12) Twelfth means of the method for discharging a heat medium in a prior step is that in which in any one of the above-described injection molding devices (1) to (7), at the same time with termination of a heating step, a heat-medium switching delay timer is actuated, by time-up which is indicated by the heat-medium switching delay timer or a heat-medium switching start signal corresponding to progress of injection steps, supply of scavenging compressed air is started and the mold bypass circuit is opened, at a point in time when time-up is indicated by a predetermined timer or at a point in time when a heat-medium passage sensor installed at a mold supply-side piping detects the scavenging compressed air, the mold bypass circuit is blocked, and also at a point in time when time-up is indicated by the predetermined timer or at a point in time when the heat-medium passage sensor installed at the mold discharge-side piping detects the scavenging compressed air, supply of the scavenging compressed air is stopped.

(13) Thirteenth means of the method for discharging a heat medium in a prior step is that in which in any one of the above-described injection molding devices (1) to (7), at the same time with termination of a heating step, a heat-medium switching delay timer is actuated, by time-up which is indicated by the heat-medium switching delay timer or a heat-medium switching start signal corresponding to progress of injection steps, supply of scavenging compressed air is started, and the mold bypass circuit is opened, at a point in time when time-up is indicated by a predetermined time or at a point in time when the heat-medium passage sensor installed at the supply-side piping in the vicinity of the mold detects the scavenging compressed air, supply of the scavenging compressed air is stopped and a cooling operation start delay timer is actuated, by time-up which is indicated by the cooling operation start delay timer or a cooling start signal corresponding to progress of injection steps, supply of a cooling medium is started, at a point in time when time-up is indicated by a predetermined timer or at a point in time when the heat-medium passage sensor detects the cooling medium, the mold bypass circuit is blocked.

(14) Fourteenth means of the method for discharging a heat medium in a prior step is the above-described method for discharging a heating medium (12) to (13) in which supply of a heating medium is stopped by time-up which is indicated by a timer which is actuated from start of supplying the heating medium and/or at a point in time when the temperature of the mold reaches a predetermined temperature.

(15) Fifteenth means of the method for discharging a heat medium in a prior step is that in which in any one of the above-described injection molding devices (1) to (7), at the same time with termination of a cooling step, a heat-medium switching delay timer is actuated, by time-up which is indicated by the heat-medium switching delay timer or a heat-medium switching start signal corresponding to progress of injection steps, supply of scavenging compressed air is started and the mold bypass circuit is opened, at a point in time when time-up is indicated by a predetermined timer or at a point in time when the heat-medium passage sensor installed at the mold supply-side piping detects the scavenging compressed air, the mold bypass circuit is blocked, and at a point in time when time-up is indicated by the predetermined timer or at a point in time when the heat-medium passage sensor installed at the mold discharge-side piping detects the scavenging compressed air, supply of the scavenging compressed air is stopped.

(16) Sixteenth means of the method for discharging a heat medium in a prior step is that in which in the above-described injection molding devices (1) to (7), at the same time with termination of a cooling step, a heat-medium switching delay timer is actuated, by time-up which is indicated by the heat-medium switching delay timer or a heat-medium switching start signal corresponding to progress of injection steps, supply of scavenging compressed air is started and the mold bypass circuit is opened, at a point in time when time-up is indicated by a predetermined timer or at a point in time when the heat-medium passage sensor installed at the supply-side piping in the vicinity of the mold detects the scavenging compressed air, supply of the scavenging compressed air is stopped and a heating operation start delay timer is actuated, by time-up which is indicated by the heating operation start delay timer or a heating start signal corresponding to progress of injection steps, a heating medium supply valve is opened, at a point in time when time-up is indicated by the predetermined timer or at a point in time when the heat-medium passage sensor detects a heating medium, the mold bypass circuit is blocked.

(17) Seventeenth means of the method for discharging a heat medium in a prior step is the above-described method for discharging a cooling medium (15) to (16) in which supply of the cooling medium is stopped by time-up which is indicated by a timer which is actuated from start of supplying the cooling medium and/or at a point in time when the temperature of the mold reaches a predetermined temperature.

(18) Eighteenth means of the method for discharging a heat medium in a prior step is a method for discharging a heating medium from a mold in any one of the above-described injection molding devices (1) to (7) in which in a heating step, during the first half of heating, the discharge pipe bypass on-off valve is opened which is installed on the variable flow control valve bypass pipe which bypasses the variable flow control valve installed on a pipe between a heat medium discharge pipe from the mold and a mixer, and during the second half of heating, the discharge pipe bypass on-off valve is closed, a heating medium is adjusted for a flow rate and a pressure by using the variable flow control valve, and the pressure of the heating medium on termination of heating is made higher than the pressure thereof during the first half of heating.

(19) Nineteenth means of the method for discharging a heat medium in a prior step is a method for discharging a heating medium from the mold in any one of the above-described injection molding devices (1) to (7) in which while a heat medium which enters from a heat medium discharge pipe leading from the mold to a mixer is high in temperature, a discharge pipe bypass on-off valve installed on the variable flow control valve bypass pipe is opened, and a heat medium discharge valve is closed which connects the discharge pipe leading from the mold with a return pipe to external cooling equipment, thereby the heat medium is introduced into the mixer, and while the heat medium which enters from the discharge pipe into the mixer is not high in temperature, the heat medium discharge valve is opened which connects the discharge pipe leading from the mold with the return pipe to the external cooling equipment, thereby the heat medium discharged from the mold through the discharge pipe is discharged into the external cooling equipment.

Advantageous Effect of the Invention

According to an injection molding device of the present invention, even where a heat-medium supply source such as a boiler is not sufficiently capable of elevating a pressure of the heat medium to fail in sufficiently raising a temperature of the heat medium to be supplied up to a target temperature on heating the mold, it is possible to raise the temperature of the mold up to the target temperature within a short period of time by preventing the heating rate from reducing during the second half of a heating step of the mold. Further, as compared with a case where the discharge rate adjusting unit is mounted on the mold temperature adjustor, the discharge pipe in which the heat medium is sealed during the second half of the heating step of the mold is short in pipe length and also lower in a quantity of the heat medium to be sealed. It is, thus, possible to raise a pressure of the heat medium up to a pressure of the heat-medium supply source within a short period of time. Further, there is no chance that the heat medium in a discharge rate adjusting unit will be decreased in temperature due to influences of a cooling medium inside the mold temperature adjustor.

Further, the heat medium is deprived of heat by the mold and the heat medium which flows into the discharge pipe is in a low temperature and pressure state during the first half of heating. It is, therefore, acceptable that discharge pipe members may be low in heat and pressure resistance capacities. However, there is a case that a heat medium which flows into the discharge pipe maintains a high temperature state because the mold rises in temperature during the second half of heating. On the other hand, the variable flow control valve installed on the discharge pipe is narrowed to reduce the pressure of the heat medium at the variable flow control valve portion, thereby allowing the use of a discharge pipe member lower in heat and pressure resistance. That is, the heat medium which is downstream from the variable flow control valve can be decreased in temperature and pressure to eliminate a necessity for using a discharge pipe member high in heat and pressure resistance, thereby making design easy. Further, since a discharge pipe member is reduced in thermal stress, it is possible to prevent breakage of pipe members and leakage of the heat medium from a broken area.

Still further, in particular, where the discharge pipe bypass on-off valve and the variable flow control valve installed on the discharge pipe are completely closed, inside piping downstream from the discharge pipe bypass on-off valve and the variable flow control valve, a heat medium which is lowered in temperature inside the pipe due to heat release into an atmosphere can be separated from a heat medium which is inside the mold and high in temperature. Therefore, the heat medium higher in temperature inside the mold is not deprived of heat by the heat medium lower in temperature which is downstream. Thus, it is further possible to raise the temperature of the mold up to a target temperature within a shorter period of time.

Inventions related to the above descriptions (18) to (19) are the methods for discharging a heat medium which are the eighth to the nineteenth means using the first to the seventh means of the injection molding device. That is, when a heat medium is switched for heating or cooling the mold, a determination is made for a type of passed heat medium by a detection signal of a heat-medium passage sensor. Alternatively, by a signal from a timer which estimates time when a heat medium in a next step reaches the mold, a heat medium in a prior step remaining inside the supply pipe is discharged into the discharge pipe through the bypass pipe not through the mold greater in flow resistance and, thereafter, the heat medium in the next step is supplied to the mold. It is, thereby, possible to shorten the heat-medium switching time.

In the inventions related to the above descriptions (8) to (19), where a shaped article is thin and large in area and if heat-exchange which is uniform and as quick as possible is given to the mold, each of narrow pipes is two to one hundred times greater in flow resistance than the bypass pipe. Further, a large-size heat medium supply/discharge circuit which is longer in distance from a heat-medium supply source to the mold and in which a volume inside the piping is greater than a channel volume inside the mold is in particular effective in shortening the heat-medium switching time as well as in reducing the loss of thermal energy.

In the invention related to the above description (18), during the first half of a heating step, the heating medium is supplied in a large quantity to the mold, while maintained at the low levels in flow resistance on discharge, and during the second half of the heating step, prior to a discharge step of the heating medium, a pressure inside the mold on termination of heating is maintained at the high levels. Thereby, the heating medium inside the mold at the start of heating is allowed to flow out at a high speed and the discharge time of the heating medium inside the mold can be shortened. Further, on termination of heating, the heating medium inside the mold can be kept at a high pressure which is stationary and uniform. In order that variation in pressure of the heating medium will not occur in association with fluid pressure loss found in a heat medium channel inside the mold which is narrow and complicated in shape, regardless of the shape of the heat medium channel inside the mold, a static pressure is applied at the start of discharging the heating medium even to a part to which a fluid pressure of the heat medium channel inside the mold is transmitted to a lesser extent and the heating medium is difficult to push out. Since a sufficient pressure is available for discharging the heating medium, it is possible to prevent the heating medium from stagnating and improve the efficiency of discharging the heating medium. Further, the time inside the piping is to be maintained at the high levels in pressure only during the second half of the heating step, which is shorter in heating time and effective in energy saving.

Further, since the heating medium inside the mold is maintained at the high levels in pressure during the second half of the heating step, the heating medium can be maintained at the high levels in temperature. Then, in a state wherein the temperature of the heating medium becomes approximate to that of the mold and the mold rises in temperature slowly, the heating time can be shortened to effectively improve the energy efficiency of a heat exchange. Further, the first half of the heating step is switched to the second half of the heating step at a point in time when a temperature of the mold reaches a preset switching temperature or at a point in time when time-up is indicated by a timer such as a timer which is actuated from the start of heating. Thereby, it is possible to realize a high reproducibility of the pressure of the heating medium inside the mold and to obtain stable control.

In the invention related to the above description (19), a heat medium which is discharged from the mold into the heat medium discharge pipe leading to the temperature adjustor is introduced into the mixer for mixing the heat medium with a cooling medium supplied from external cooling equipment for the purpose of lowering the temperature of the heat medium, when the heat medium is at a high temperature. In addition, the heat medium is directly discharged into a cooling water return pipe which connects to the external cooling equipment, when the heat medium which is discharged into the heat medium discharge pipe is not at a high temperature. Thereby, when the heat medium is not high in temperature, the heat medium can be discharged without passing through the mixer greater in flow resistance and longer in discharge time. Thus, time necessary for discharging the heat medium can be shortened to realize high energy efficiency.

Each of the inventions related to the above descriptions (8) to (10) is a method for discharging a heat medium in a prior step in which after supply of a heat medium in a prior step is stopped, at the same time when supply of a heat medium in a next step is started, the mold bypass on-off valve is opened which is installed on the mold bypass pipe to couple the supply-side supply pipe of the heat medium to the discharge-side junction pipe, thereby the heat medium in the prior step which remains inside the supply-side junction pipe from the heat-medium supply source to the mold bypass on-off valve is purged into the discharge-side junction pipe through the mold bypass pipe, thereafter, a heat medium in a next step is supplied, and at a point in time when the heat medium in the next step reaches the vicinity of the mold, the mold bypass on-off valve is closed to feed the heat medium in the next step into the mold.

According to the method for discharging a heat medium in a prior step, the heat medium in the prior step which remains inside the supply-side junction pipe of the heat medium is pushed by the cooling medium in the next step when switching a step, thereby flowing into the mold to develop a state as though the prior step still continues. In addition, even in this state, it is possible to prevent the mold from overshooting or undershooting a target temperature. Further, the heat medium can be discharged without passing through many narrow pipes which are greater in flow resistance, installed inside the mold and involved in heating and cooling of the mold. It is, thereby, possible to reduce the time necessary for the heat medium to reach the mold from a heat-medium supply source and quickly adjust a temperature of the mold. It is also possible to adjust the temperature of the mold with improved accuracy.

Each of the inventions related to the above descriptions (12) and (14) is a method for discharging a heating medium in which, after supply of a heating medium in a prior step is discontinued at a timing when the mold temperature adjustor is adjusted when switching a step, the mold bypass on-off valve is opened which is installed on the mold bypass pipe to couple the supply pipe of the heat medium to the discharge pipe of the heat medium, and an on-off valve of scavenging compressed air is opened at the same time, thereby, the heat medium in the prior step remaining inside the supply-side junction pipe of the heat medium is purged into the discharge-side junction pipe by the scavenging compressed air passing through the mold bypass pipe, thereafter, with supply of the scavenging compressed air being continued, the mold bypass on-off valve is closed to feed the scavenging compressed air into the mold, by which at a point in time when the heating medium remaining in a heat medium circuit inside the mold is discharged into a drain pipe, supply of the scavenging compressed air is stopped.

According to the method for discharging a heating medium, the heating medium remaining inside the supply-side junction pipe of the heat medium is pushed by a heat medium in a next step when switching a step, thereby flowing into the mold to develop a state as though the heating step still continues. In addition, even in this state, it is possible to prevent the mold from being excessively heated up to a temperature in excess of a temperature on completion of heating as a mold target temperature. Further, not only can the heat medium be discharged without passing through many narrow pipes which is greater in flow resistance, installed inside the mold and involved in heating and cooling the mold, but also the time necessary for discharging the heating medium inside the heat medium circuit and the supply pipe of the mold can be reduced, because air smaller in fluid pressure loss than liquid is used for scavenging the heat medium in the prior step. Still further, after the mold bypass on-off valve is closed, the scavenging compressed air is supplied forcibly into channels inside the mold, by which the heating medium inside the mold can be reliably discharged before the heat medium in the next step is supplied.

Each of the inventions related to the above descriptions (13) and (14) is a method for discharging a heating medium in which after supply of a heating medium in a prior step is discontinued at a timing when the mold temperature adjustor is adjusted when switching a step, the mold bypass on-off valve is opened which is installed on the mold bypass pipe to couple the supply pipe of the heat medium to the discharge pipe of the heat medium, and an on-off valve of scavenging compressed air is opened at the same time, thereby, the heat medium in the prior step remaining inside the supply-side junction pipe of the heat medium is purged into the discharge-side junction pipe by the scavenging compressed air passing through the mold bypass pipe, thereafter, supply of the scavenging compressed air is stopped, with the mold bypass on-off valve being opened, further, supply of a cooling medium in a next step is started, and at a point in time when the cooling medium reaches the vicinity of the mold, the mold bypass on-off valve is closed to feed the cooling medium into the mold.

According to the method for discharging a heating medium, the heating medium remaining inside the supply-side junction pipe of the heat medium is pushed by the heat medium in the next step when switching a step, thereby flowing into the mold to develop a state as though the heating step still continues. In addition, even in this state, it is possible to prevent the mold from being excessively heated up to a temperature in excess of a temperature on completion of heating as a mold target temperature. Further, without passing through many narrow pipes which are greater in flow resistance, installed inside the mold and involved in heating and cooling the mold, not only can the heat medium but also the scavenging compressed air inside the supply pipe from a source of supplying the scavenging compressed air to the mold bypass on-off valve be discharged. Thereby, time for a cooling medium to reach the mold from a source of supplying the cooling medium can be reduced to quickly adjust the temperature of the mold.

Each of the inventions related to the above descriptions (15) and (17) is a method for discharging a cooling medium in which after supply of a cooling medium in a prior step is stopped, the mold bypass on-off valve is opened which is installed on the mold bypass pipe to couple the supply pipe of the heat medium to the discharge pipe, supply of the scavenging compressed air is started at the same time, the cooling medium remaining inside the supply-side junction pipe of the cooling medium is purged into the discharge-side junction pipe by the scavenging compressed air passing through the mold bypass pipe, thereafter, with supply of the scavenging compressed air being continued, the mold bypass on-off valve is closed to feed the scavenging compressed air into the mold, thereby, at a point in time when the cooling medium remaining on a heat medium circuit inside the mold is discharged into a drain pipe, supply of the scavenging compressed air is stopped.

According to the method for discharging a cooling medium, the cooling medium remaining inside the supply-side junction pipe of the heat medium is pushed by the heat medium in the next step when switching a step, thereby flowing into the mold as though the cooling step still continues. In addition, even in this state, it is possible to prevent the mold from being excessively cooled to a temperature below a target temperature on cooling the mold. Further, not only can the heat medium be discharged without passing through many narrow pipes which are greater in flow resistance, installed inside the mold and involved in heating and cooling the mold, but also air smaller in fluid pressure loss than liquid is used to scavenge the heat medium in the prior step, by which time necessary for discharging the cooling medium inside the heat medium circuit and the supply pipe of the mold can be reduced. Still further, after the mold bypass on-off valve is closed, the scavenging compressed air is supplied forcibly into channels inside the mold. It is, thereby, possible to reliably discharge the heating medium inside the mold before supply of the heat medium in the next step.

Each of the inventions related to the above descriptions (16) and (17) is a method for discharging a cooling medium in which after supply of a cooling medium in a prior step is stopped at a timing when the mold temperature adjustor is adjusted when switching a step, the mold bypass on-off valve is opened which is installed on the mold bypass pipe to couple the supply pipe of the heat medium to the discharge pipe thereof, supply of the scavenging compressed air is started at the same time, the cooling medium remaining inside the supply-side junction pipe of the cooling medium is purged into the discharge-side junction pipe by the scavenging compressed air passing through the mold bypass pipe and, thereafter, the on-off valve of the scavenging compressed air is closed, with the mold bypass on-off valve being opened, supply of the heating medium in the next step is started, thereby the mold bypass on-off valve is closed at a point in time when the heating medium reaches the vicinity of the mold from the supply pipe to feed the heating medium into the mold.

According to the method for discharging a cooling medium, the cooling medium remaining inside the supply-side junction pipe of the heat medium is pushed by the heat medium in the next step when switching a step, thereby flowing into the mold as though the cooling step still continues. In addition, even in this state, it is possible to prevent the mold from being excessively cooled to a temperature below a target temperature on cooling the mold. Further, without passing through many narrow pipes which are greater in flow resistance, installed inside the mold and involved in cooling and heating the mold, not only can the heat medium but also the scavenging compressed air inside the supply pipe from a source of supplying the scavenging compressed air to the mold bypass on-off valve be discharged. Thereby, time for a heating medium to reach the mold from a heating medium supply source can be reduced to adjust the temperature of the mold quickly.

MODE FOR CARRYING OUT THE INVENTION

Figure 1:
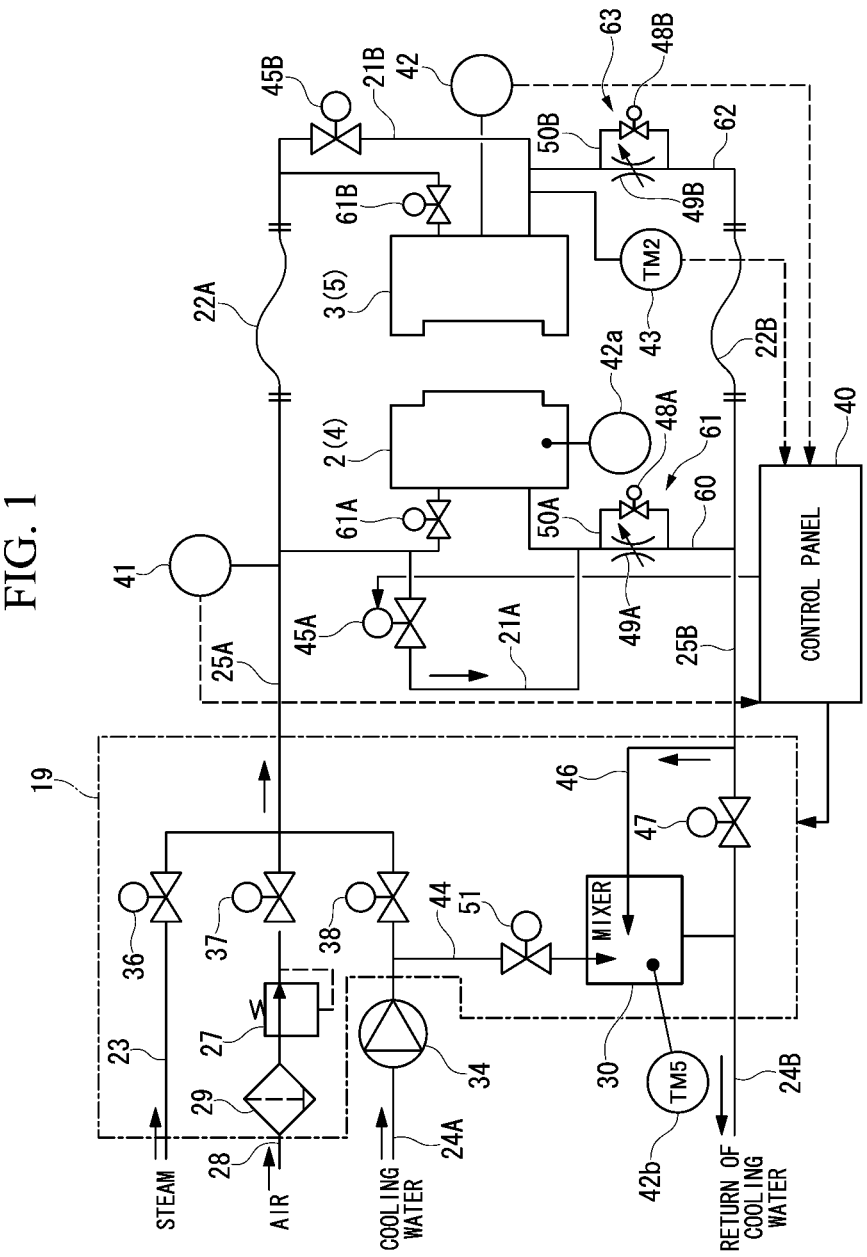
FIG. 1 is a schematic view which shows a mold heating circuit installed on an injection molding device related to an embodiment of the present invention.

A description will be given of two modes of the injection molding device which has a constitution of a heating/cooling medium supply/discharge circuit of a mold capable of rapidly heating and cooling the mold in control of heating of the mold. A description is also given of a method for controlling a temperature of the mold by heating and cooling the mold by using the heating/cooling medium supply/discharge circuit. In the present embodiment, a drawing covering a resin injection channel, an injection unit and the like is omitted in a schematic view of the heating/cooling medium circuit of the mold.

In the present embodiment, steam as a heating medium and cooling water as a cooling medium are used in both a cavity side part and a movable side part of the injection molding device. The present embodiment is provided with a nesting which internally houses a supply-side manifold connected to a supply pipe for scavenging compressed air, a discharge-side manifold connected to a discharge pipe and many heating/cooling narrow pipes to which both of the manifolds are connected and also provided with a mold temperature sensor. However, a high-temperature fluid such as high-temperature pressurized water other than steam may be used as a heating medium, or a low-temperature fluid other than cooling water may be used as a cooling medium.

In injection molding steps, the heating/cooling medium circuit is controlled so as to repeat a molding cycle in such a manner that the cavity side part and the movable side part are closed, before mold clamping is carried out to inject a resin, a heating medium is caused to circulate in the mold to heat the mold up to a temperature preferable for resin injection, then, the resin is injected, after injection, the heating medium is changed to a cooling medium which is then caused to circulate into the mold, by which the mold is cooled down to less than a temperature at which the resin is solidified. In the above-described constitution as well as temperature adjustment and control of the mold are known technologies which have been applied to a conventional injection molding machine.

Modes of the injection molding device carried out by the claims of the present invention are available in various embodiments by combination of the claims. A description will be hereinafter given in detail for the representative embodiments.

In the embodiments of the present invention, the heating/cooling medium circuit of the mold is applicable to both the cavity side part and the movable side part. However, in view of the quality, and so on., demanded of a shaped article by injection molding, the heating/cooling medium circuit may be applicable only to the cavity side part or the movable side part of the mold. Where the circuit is applicable only to the cavity side part or the movable side part, it is possible to eliminate a mold temperature sensor and a bypass pipe which are inherently in association with one of the movable side part and the cavity side part which is free of heating/cooling control.

Further, in the present embodiment, a temperature of the mold and passage of a heat medium will be determined by both of the applicable cavity side part and the movable side part. However, steps may be allowed to proceed in such a manner that reaching a target temperature on heating in a heating step, reaching a target temperature on cooling in a cooling step, and so on, and complete switching of a heat medium detected by a heat-medium passage sensor are determined by only one of the cavity side part and the movable side part. Alternatively, steps may be allowed to proceed on the basis of a determination made by both the cavity side part and the movable side part. Further, steps may be allowed to proceed on the basis of a determination made by one of the cavity side part and the movable side part.

First Embodiment

The first embodiment will be described with reference to the drawings.

Figure 2:
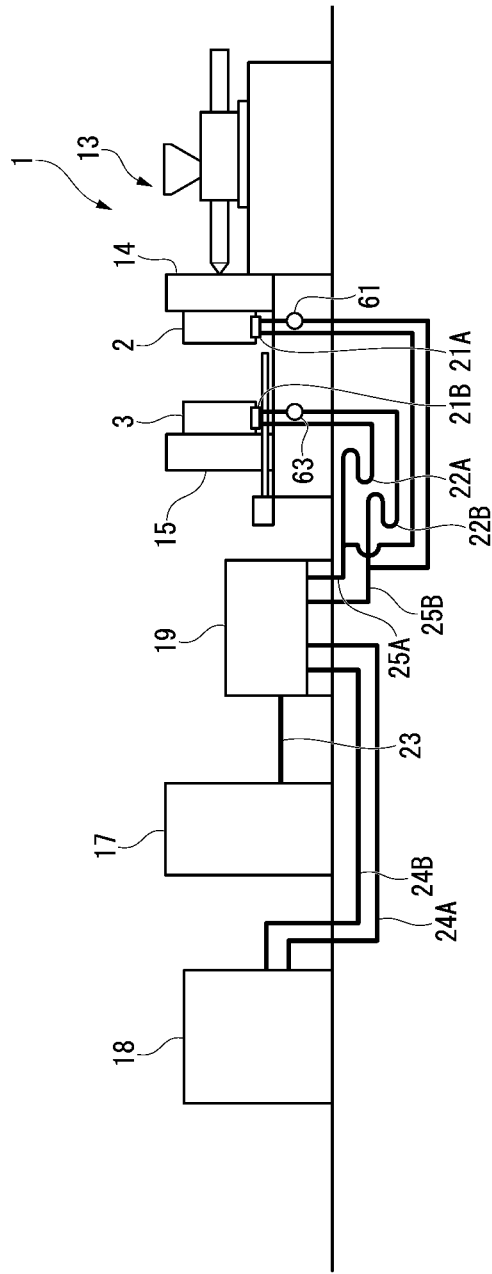
FIG. 2 is a side-face layout chart which shows an injection molding device of a first embodiment having the mold heating circuit given in FIG. 1.
Figure 4:
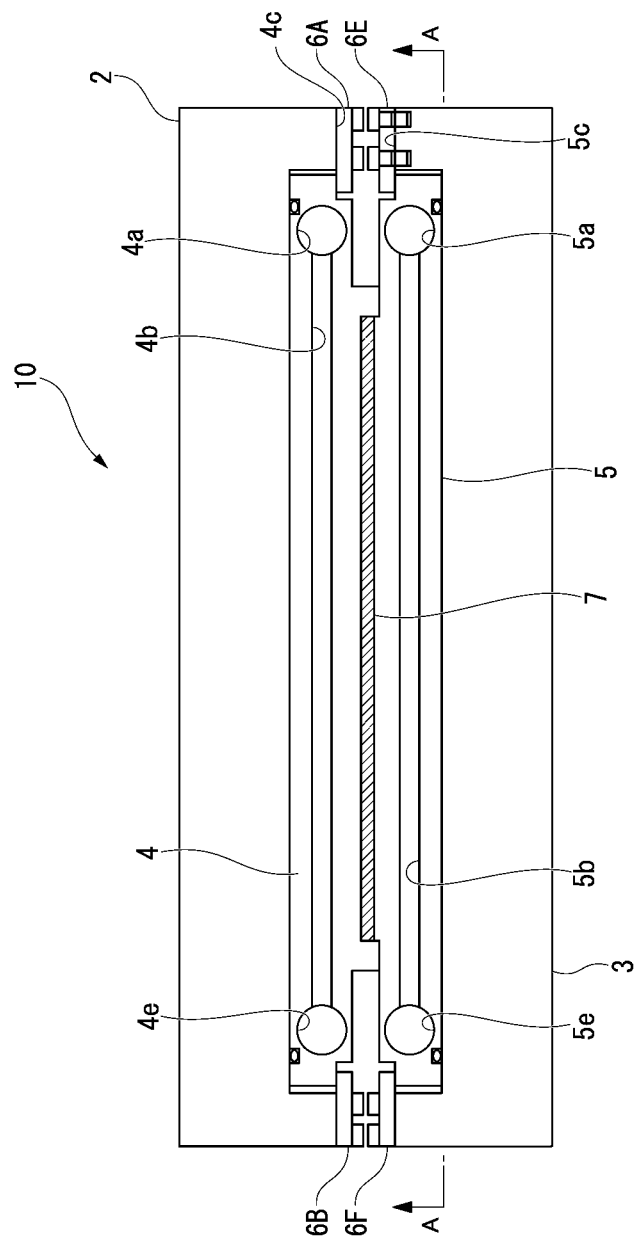
FIG. 4 is a side view which shows an example of a mold applied in the mold heating circuit given in FIG. 1.
Figure 5:
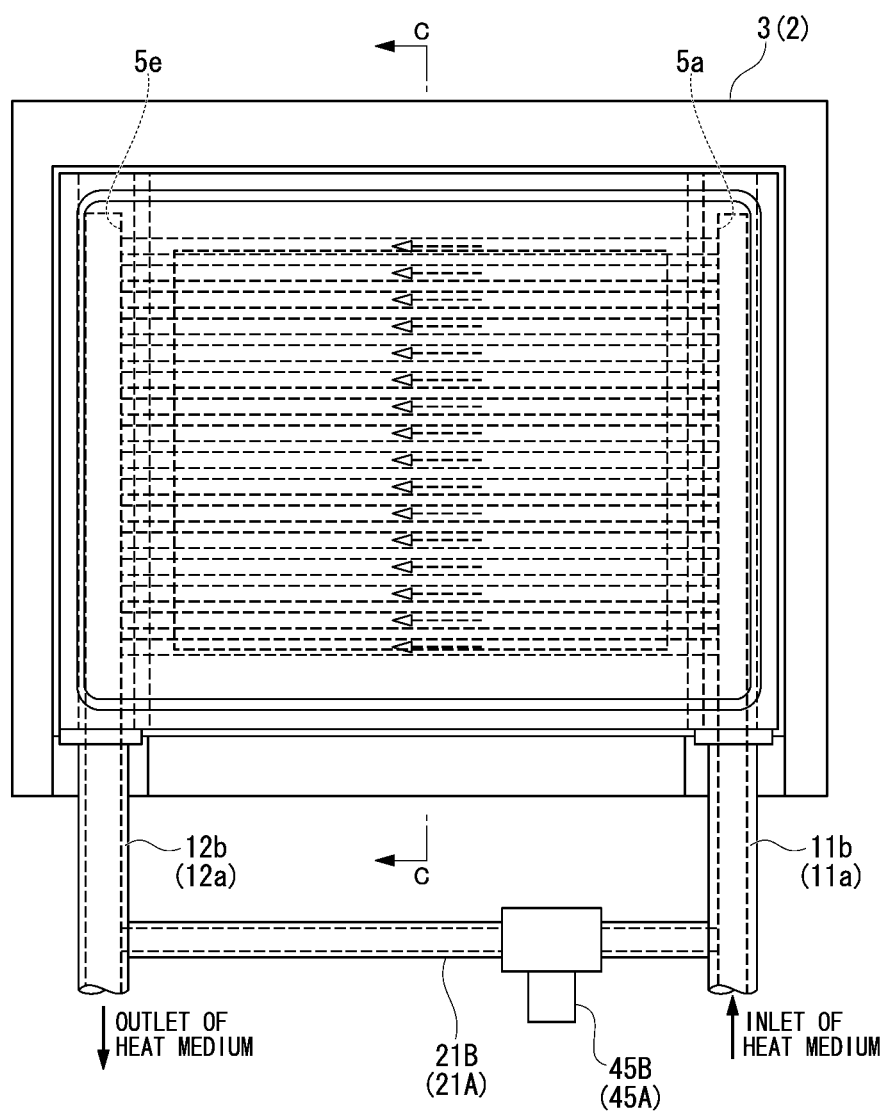
FIG. 5 is a front view of a nesting shown in a cross section of a mold in FIG. 4 which is taken along line A to A.
Figure 6:
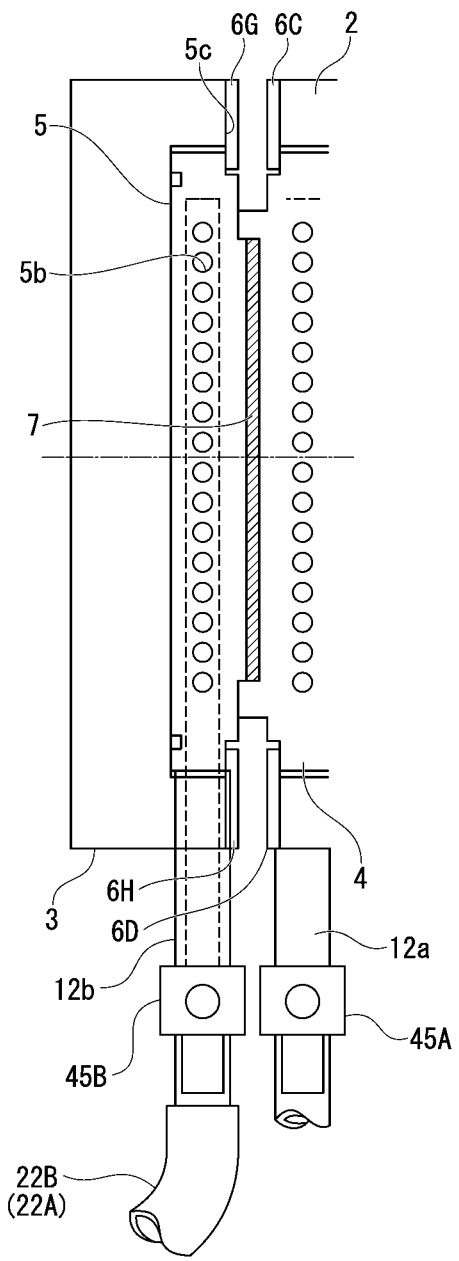
FIG. 6 is a sectional view taken along line C to C in FIG. 5.
Figure 7:
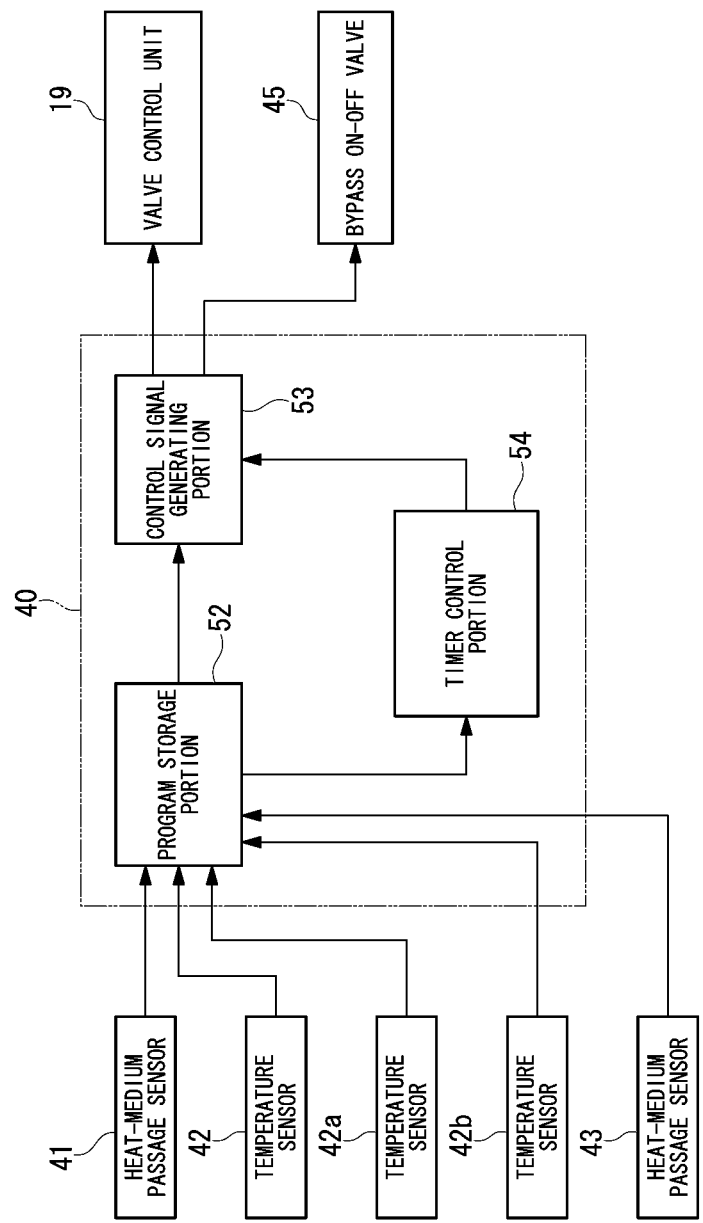
FIG. 7 is a block diagram which shows a constitution of a control panel shown in FIG. 1.
Figure 8:
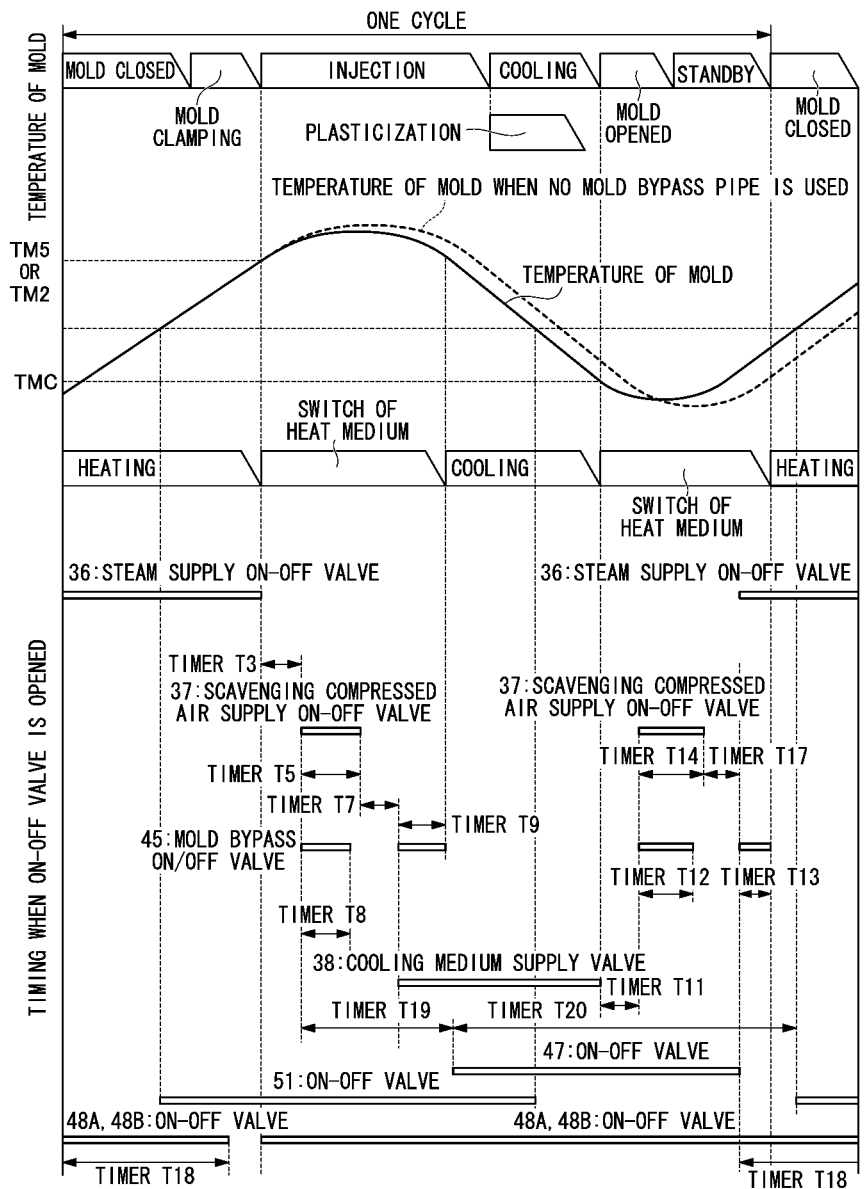
FIG. 8 is a line drawing which shows temperatures of the mold and opening timing of individual on-off valves corresponding to molding steps of an injection molding device having the mold heating circuit given in FIG. 2 and FIG. 3.

FIG. 1 is a schematic view of a mold heating circuit mounted on an injection molding device related to an embodiment of the present invention. FIG. 2 is a side-face layout chart which shows an injection molding device of the first embodiment which has the mold heating circuit in FIG. 1. FIG. 4 is a side view which shows an example of a mold applicable to the mold heating circuit in FIG. 1. FIG. 5 is a front view of a nesting shown in a cross section of the mold in FIG. 4 which is taken along line A to A. FIG. 6 is a sectional view taken along line C to C given in FIG. 5. FIG. 7 is a block diagram which shows a constitution of the control panel given in FIG. 1. FIG. 8 is a line drawing which shows temperatures of the mold and opening/closing timing of individual on-off valves corresponding to molding steps of the injection molding device which has the mold heating circuit shown in FIG. 1.

In FIG. 2 which is a side-face layout chart of the injection molding device, an injection molding device 1 is provided with an injection unit 13, a cavity side part 2 attached to a fixed retainer plate 14, a movable side part 3 attached to a movable retainer plate 15, a boiler 17 for steam generation, cooling equipment 18 such as a cooling tower, a valve controller unit (mold temperature adjustor) 19, a cavity-side discharge rate adjusting unit 61 installed on a cavity-side discharge pipe 60 connected to the cavity side part 2, and a movable-side discharge rate adjusting unit 63 installed on a movable-side discharge pipe 62 connected to the movable side part 3.

As shown in FIG. 1, the valve controller unit (mold temperature adjustor) 19 houses a steam supply pipe 23, a steam supply on-off valve 36, a scavenging compressed air supply pipe 28, an air filter 29, a scavenging compressed air pressure-reducing valve 27, a scavenging compressed air supply on-off valve 37, a cooling water supply pipe 24A, a cooling water supply on-off valve 38, an on-off valve 47 for discharging a used heat medium, an on-off valve 51 on a pipe for allowing cooling water to flow into a mixer 30 or the like. The reference numeral 34 depicts a cooling water pump. A movement region of the mold for opening and closing the mold to take out a shaped article is increased with an increase in size of injection molding equipment. In order not to interfere with the movement region of the mold, a place at which the valve controller unit 19 has been installed is positioned so as to be away from the mold.

Steam is fed through the steam supply pipe 23 from the boiler 17 to the valve controller unit (mold temperature adjustor) 19, and cooling water is fed through the cooling water supply pipe 24A from the cooling equipment 18 such as the cooling tower to the valve controller unit (mold temperature adjustor) 19. Used cooling water is recovered through the cooling water discharge pipe 24B into the cooling equipment 18 such as a cooling tower. Steam, cooling water and scavenging compressed air from the valve controller unit (mold temperature adjustor) 19 to the nestings 4, 5 of the cavity side part 2 and the movable side part 3 are supplied and discharged through a supply-side junction pipe (supply pipe) 25A and a discharge-side junction pipe (discharge pipe) 25B which are commonly used. Flexible pipes 22A, 22B are connected to the junction pipes 25A, 25B leading to the nesting 5 of the movable side part 3 so as to correspond to mold opening/closing movement of the movable side part 3. The cavity side part 2 and the movable side part 3 are both provided with mold bypass pipes 21A, 21B for bypassing an inlet and an outlet of the heat medium. Mold bypass on-off valves 45A, 45B are installed on the mold bypass pipes 21A, 21B. In FIG. 1 which shows the present embodiment, discharge rate adjusting units 61, 63 are installed downstream at joining portions between the mold bypass pipes 21A, 21B and the discharge pipes 60, 62. However, in order to further decrease a quantity of the heat medium sealed inside the mold during the second half of heating, the discharge rate adjusting units 61, 63 may be installed upstream at the joining portions between the discharge pipes 60, 62 and the mold bypass pipes 21A, 21B.

A heat-medium passage sensor (temperature sensor, and so on) 41 for detecting passage of steam, scavenging compressed air and cooling water is installed on the supply-side junction pipe 25A of the heat medium near the cavity side part 2. Further, a temperature sensor 42a for detecting a temperature of the cavity surface of the nesting 4 of the cavity side part 2 is installed on the mold, and a temperature sensor 42 for detecting a temperature of the cavity surface of the nesting 5 is installed on the movable side part 3. Still further, a heat-medium passage sensor (temperature sensor, etc.) 43 for detecting passage of steam, scavenging compressed air and cooling water is installed on a heat medium discharge pipe from the movable side part 3. It is acceptable that a plurality of temperature sensors 42a, 42 are arranged on the cavity surfaces of the nestings 4, 5 to check temperature distribution of each of the nestings 4, 5, by which a mean temperature is selected for control, a temperature determination program is used for selective control or a representative sensor is decided for control.

An on-off valve 47 is installed on the discharge-side junction pipe 25B of the cavity side part 2 and the movable side part 3, and the mixer 30 for mixing steam with cooling water discharged from the mold is installed on the discharge-side junction pipe 25B of the cavity side part 2 and the movable side part 3 so as to be in parallel with the on-off valve 47. A coupling pipe 44 is installed which couples the mixer 30 to the cooling water supply pipe 24A of the cooling equipment 18 such as a cooling tower. An on-off valve 51 is installed on the coupling pipe 44. By the detection of a high-temperature heat medium by the heat-medium passage sensor 43 or by the control of timers housed inside the control panel 40 for estimating a flow state of steam, and so on, the on-off valves 47, 48, 51 are opened and closed to control the heat medium flowing into the mixer 30. There is installed a discharge pipe 46 between the discharge-side junction pipe 25B and the mixer 30. The mixer 30 is not an essential constituent of the present invention, and steam which has been discharged from the mold may be released into an atmosphere as it is.

A control panel 40 is installed on the injection molding device 1 or the valve control unit (mold temperature adjustor) 19, or is installed in association with above-described devices. As shown in FIG. 7, the control panel 40 is provided with a program storage portion 52 which stores a temperature determination program composed of a mold temperature determination program and a heat-medium passage determination program, a timer control portion 54 which outputs a time setting signal, and a control signal generating portion 53 which generates a control signal for switching, supplying and controlling steam, cooling water and scavenging compressed air to the cavity side part 2 and the movable side part 3 by the valve control unit (mold temperature adjustor) 19 and a control signal by which the cavity side part 2 and the movable side part 3 conduct molding movements such as mold closing, mold opening and injection/filling on the basis of determination results by the temperature determination program and the time setting signal.

As shown in FIG. 1, the cavity-side discharge rate adjusting unit 61 is provided with a variable flow control valve 49A which is installed on the cavity-side discharge pipe 60 connected to the cavity side part 2, a variable flow control valve bypass pipe 50A which bypasses the variable flow control valve 49A and is communicatively connected to the cavity-side discharge pipe 60 on the upstream side thereof and on the downstream side thereof, and a discharge pipe bypass on-off valve 48A which is installed on the variable flow control valve bypass pipe 50A.

The discharge pipe bypass on-off valve 48A is a so-called block valve and able to switch the variable flow control valve bypass pipe 50A communicatively connected to the cavity-side discharge pipe 60 either to an open state in which a heat medium can be distributed or a closed state in which a heat medium cannot be distributed. On the other hand, the variable flow control valve 49A is a so-called flow control valve and able to adjust arbitrarily a flow rate of the heat medium flowing through the cavity-side discharge pipe 60 from a fully opened state to a fully closed state.

According to the above-described constitution of the cavity-side discharge rate adjusting unit 61, during the first half of a heating step of the cavity side part 2, that is, immediately after start of the heating step, both the discharge pipe bypass on-off valve 48A and the variable flow control valve 49 are opened, and the heat medium is distributed in a large quantity, thereby heating rapidly the cavity side part 2. On the other hand, during the second half of the heating step, that is, after elapse of a predetermined time from start of the heating step or in a state that the temperature sensor 42a detects that the mold has reached a predetermined temperature which is lower than a target temperature and a temperature of the cavity side part 2 is brought closer to the target temperature, the discharge pipe bypass on-off valve 48A is closed, and the variable flow control valve 49 is adjusted to control a pressure inside the cavity side part 2. Thereby, the cavity side part 2 can be adjusted for temperature with high accuracy.

As the variable flow control valve 49A, a block valve may be used in place of a flow control valve. That is, the variable flow control valve in the present application includes a block valve which can fully close a pipe. More specifically, when the block valve is used to fully close the cavity-side discharge pipe 60, the pressure of the heat medium inside the cavity side part 2 can be brought closer to the pressure generated at a source of supplying steam. Thus, it is possible to prevent the heat medium from lowering in temperature. However, when the variable flow control valve bypass pipe 50A is in a fully closed state, the heat medium will remain stagnant inside the mold and no heat medium will be newly supplied to the cavity side part 2. Therefore, such a case is found that the heat medium which remains stagnant is continuously deprived of heat by the cavity side part 2 and the heat medium is decreased in temperature inside the cavity side part 2 to result in longer heating time of the mold. Further, use of steam as a heat medium may result in such a case that the steam is partially liquefied due to a lowering in liquefaction temperature and water remains in the vicinity of the mold or a discharge port, thereby accelerating further liquefaction of the steam and lowering in temperature. With the above cases taken into account, the flow control valve is used to keep the cavity-side discharge pipe 60 in a slightly opened state, and the heat medium is allowed to flow slightly, by which renewed heat is constantly supplied to the cavity side part 2. Thereby, in addition to an advantage that the heat medium is less likely to lower in temperature inside the cavity side part 2, there is obtained an advantage that the condensed heat medium is discharged through the flow control valve and will not stay inside the cavity side part 2. There is also obtained such an advantage that water resulting from liquefied steam can be prevented from staying inside the mold or in the vicinity of the discharge port.

On the other hand, as shown in FIG. 1, the movable-side discharge rate adjusting unit 63 is provided with a variable flow control valve 49B which is installed on the movable-side discharge pipe 62 connected to the movable-side part 3, a variable flow control valve bypass pipe 50B which bypasses the variable flow control valve 49B and is communicatively connected to the movable-side discharge pipe 62 on the upstream side thereof and on the downstream side thereof, and a discharge pipe bypass on-off valve 48B which is installed on the variable flow control valve bypass pipe 50B. The discharge pipe bypass on-off valve 48B, the variable flow control valve bypass pipe 50B and the variable flow control valve 49B are the same in constitution and working effect respectively to the discharge pipe bypass on-off valve 48A, the variable flow control valve bypass pipe 50A and the variable flow control valve 49A. Therefore, the description thereof will be omitted here.

As described so far, in the present embodiment, the cavity-side discharge rate adjusting unit 61 and the movable-side discharge rate adjusting unit 63 are installed respectively on the cavity-side discharge pipe 60 and the movable-side discharge pipe 62 which are positioned on the upstream side of the control valve unit (mold temperature adjustor) 19. Thus, as compared with a case where the discharge rate adjusting unit is mounted on the valve control unit 19, piping on the discharge-side in which steam is sealed during the second half of a heating step of the mold is decreased in length. Thereby, the steam is reduced in fluid pressure loss and also reduced in heat release quantity which is released into surrounding areas from the discharge-side piping. It is, therefore, possible to prevent reduction in the heating rate of the mold due to deteriorated heating effect of the steam. In particular, even where a source of supplying the steam such as a boiler is not sufficiently capable of elevating a pressure to fail in sufficiently raising a temperature of the steam to be supplied up to a target temperature on heating the mold, reduction in the heating rate of the mold can be prevented during the second half of the heating step to heat the mold up to the target temperature in a short period of time.

Further, in the present embodiment, the cavity-side discharge rate adjusting unit 61 is separately provided from the movable-side discharge flow rate unit 63. Thus, such an advantage is obtained that the cavity side part 2 and the movable side part 3 can be adjusted for temperatures independently to attain a more highly accurate temperature control.

As shown in FIG. 1, in the present embodiment, the cavity-side discharge rate adjusting unit 61 and the movable-side discharge rate adjusting unit 63 are installed at the respective centers of the cavity-side discharge pipe 60 and the movable-side discharge pipe 62 along the steam distributing direction. It is, however, preferable that the cavity-side discharge rate adjusting unit 61 and the movable-side discharge rate adjusting unit 63 are installed in close proximity respectively to the cavity side part 2 and the movable side part 3 as much as possible. It is in particular preferable that they are installed inside of the injection molding machine. Here, the inside of the injection molding machine means the inside of a region indicated by a dimension of total width by total height by total length which is the outermost dimension of the injection molding machine. The particularly preferable inside of the injection molding machine includes lower, upper, side and rear parts of the fixed retainer plate 14, the movable retainer plate 15, a movable retainer plate driving device (not shown) for causing the movable retainer plate 15 to move to the fixed retainer plate 14 in a spacing-away or an approaching direction, a tie bar (not shown) for coupling and fixing the fixed retainer plate 14 to the movable retainer plate 15, and a mold clamping unit composed of a mold clamping device (not shown) in which the tie bar is pulled to clamp the movable retainer plate 15 to the fixed retainer plate 14 to effect mold clamping as well as a lower part of the injection unit. In a large-size injection molding machine, lower, upper, side and rear parts of the mold clamping unit and a lower part of the injection unit are preferable in having the discharge rate adjusting unit 63 because they are relatively large in clearance and also in close proximity to the mold and do not interfere with opening/closing movement regions of the mold. Further, the cavity-side discharge rate adjusting unit 61 and the movable-side discharge rate adjusting unit 63 are respectively installed on a side end of the cavity-side discharge pipe 60 connected to the cavity side part 2 and a side end of the movable-side discharge pipe 62 connected to the movable side part 3. Thereby, the greatest effect is obtained in preventing a reduction in the heating rate. For example, as will be described later, the cavity-side discharge rate adjusting unit 61 may be installed on the outlet pipe 12a connected to an outlet-side manifold 4e of the cavity side part 2, while the movable-side discharge rate adjusting unit 63 may be installed on the outlet pipe 12b connected to an outlet-side manifold 5e of the movable side part 3.

Next, a description will be given of a constitution of the mold with reference to FIG. 4, FIG. 5 and FIG. 6. The nesting 4 having a heat medium path 4b is fitted into the cavity side part 2 and fixed to the cavity side part 2, with four sides held down by presser bars 6A, 6B, 6C, 6D. The nesting 5 having a heat medium path 5b is fitted into the movable side part 3 and fixed to the movable side part 3, with four sides held down by presser bars 6E, 6F, 6G, 6H. When the movable side part 3 is brought closer to the cavity side part 2 and the nesting 4 is in contact with the nesting 5, there is formed a cavity for molding a shaped article 7 on a mating surface.

The nesting 4 has manifolds 4a, 4e formed which are cylindrical holes on both sides and a plurality of heat medium paths 4b penetrate between these manifolds 4a, 4e. An inlet pipe 11a is coupled to the inlet-side manifold 4a of the heat medium, an outlet pipe 12a is coupled to the outlet-side manifold 4e of the heat medium, the inlet pipe 11a and the outlet pipe 12a are communicatively connected by a mold bypass pipe 21A, and an on-off valve 45A is installed on the mold bypass pipe 21A. In a similar manner, the nesting 5 has manifolds 5a, 5e formed on both sides and a plurality of heat medium paths 5b penetrate between these manifolds 5a, 5e. An inlet pipe 11b is coupled to the inlet-side manifold 5a of the heat medium, an outlet pipe 12b is coupled to the outlet-side manifold 5e of the heat medium, the inlet pipe 11b and the outlet pipe 12b are communicatively connected by the mold bypass pipe 21B, and an on-off valve 45B is installed on the mold bypass pipe 21B.

The manifolds 4a, 4e, 5a, 5e are installed as common channels on the inlet side and the outlet side of the heat medium. Thereby, even where variation in temperature is found in each heat medium discharged from each heat medium channel, heat is exchanged between heat media inside the manifolds 4a, 4e, 5a, 5e. Thus, the heat media stop flowing by the discharge rate adjusting units 61, 63 (or they flow slightly) and heat is transferred to a heat medium which remains stagnant inside each of the heat medium channels from the heat media inside the manifolds 4a, 4e, 5a, 5e made uniform in temperature. Thereby, each of the heat medium channels can be made uniform in temperature. That is, heat is conducted from the heat media made uniform in temperature inside the manifolds 4a, 4e, 5a, 5e, by which a heat medium channel relatively low in temperature is raised in temperature and a heat medium channel relatively high in temperature is lowered in temperature. Thus, it is possible to reduce variation in mold temperature. Further, where the discharge rate adjusting units 61, 63 are installed immediately after the manifolds 4a, 4e, 5a, 5e, heat of the heat media made uniform in temperature inside the manifolds 4a, 4e, 5a, 5e can prevent leakage through other than the heat medium discharge channel, thereby preventing heat loss and further improving efficiency in making a temperature uniform.

Where a shaped article 7 is thin and large in area and if heat-exchange which is uniform and as quick as possible is given to the nestings 4, 5 of the mold, the heat medium paths 4b, 5b, which are narrow pipes, are made smaller in size and greater in number. Therefore, the paths 4b, 5b are 2 to 100 times greater in flow resistance than the mold bypass pipes 21A, 21B, respectively. In a large-size heat medium supply/discharge pipe circuit in which a distance from the valve control unit 19 for switching supply of a heat medium to the cavity side part 2 or the movable side part 3 is long and a volume of piping connecting between them is greater than a channel volume of the nestings 4, 5 of the mold, in particular, the mold bypass on-off valves 45A, 45B which allow the heat medium to pass through the mold bypass pipes 21A, 21B are controlled for opening/closing and switching. This contributes to shortening in heat-medium switching time and is also effective in reducing loss of thermal energy.

With reference to FIG. 1 and FIG. 8, a description will be given of a temperature of the mold and timing of opening individual on-off valves corresponding to molding steps of the injection molding device. A method for controlling a mold temperature adjusting circuit is that in which in the mold temperature adjusting circuit, a heating step and a cooling step are repeated to supply scavenging compressed air during the steps. In the heating step of the mold, the steam supply on-off valve 36 of the steam supply pipe 23 is opened to supply steam via the supply-side junction pipe 25A to the cavity side part 2 and the movable side part 3, thereby heating the nestings 4, 5. When the mold temperature determination program stored inside the program storage portion 52 determines that a temperature of the mold detected by one of the temperature sensors 42, 42a on the mold or by both of them reaches a mold preset upper-limit temperature (TMS), the steam supply on-off valve 36 is closed.

In the heating step of the mold, introduction of a heat medium into the mixer 30 is controlled, the discharge pipe bypass on-off valves 48A, 48B are opened on the way to the heating step, the heat medium is caused to flow into the mixer 30 through the discharge pipe bypass on-off valves 48A, 48B and the variable flow control valves 49A, 49B, and at a final stage of the heating step, the discharge pipe bypass on-off valves 48A, 48B are closed. Thereby, the heat medium is caused to flow into the mixer 30 only through the variable flow control valves 49A, 49B. Time of opening the discharge pipe bypass on-off valves 48A, 48B is set by a timer T18. Heating time is adjusted so as to be the shortest by adjusting an opening degree of each of the variable flow control valves 49A, 49B and setting the timer T18.

At a point in time when the heating step of the mold is terminated and the cooling step of the mold is started, steam is discharged from the supply pipe. At the same time when the steam supply on-off valve 36 in a prior step is closed, a heat-medium switching delay timer T3 is actuated. By the time-up which is indicated by the heat-medium switching delay timer T3, the mold bypass on-off valves 45A, 45B are opened, the mold bypass pipes 21A, 21B are kept passable, a scavenging compressed air supply on-off valve 37 is opened for a short period of time by a timer T5 which is set in that way, and steam inside the supply-side junction pipe 25A is directly bypassed into the discharge-side junction pipe 25B. At this time, the discharge rate adjusting units 61, 63 are installed so as to be positioned upstream from the valve controller unit (mold temperature adjustor) 19 on the discharge pipe. Thus, the discharge pipe bypass on-off valves 48A, 48B are closed and the variable flow control valves 49A, 49B are narrowed, by which a heat medium inside piping downstream from the variable flow control valves 49A, 49B can be kept low in temperature and pressure. As a result, it is possible to reduce thermal stress generated on discharge pipe members downstream from the variable flow control valves 49A, 49B. This is effective in extending the service life of pipe members.

At the same time when the scavenging compressed air supply on-off valve 37 is opened, the mold bypass on-off valve 45 is opened to actuate a timer T8. The mold bypass on-off valve 45 is temporarily closed by time-up which is indicated by the timer T8.

After the time-up which is indicated by the timer T5, by a time-up signal sent from the cooling start delay timer T7, the cooling water supply on-off valve 38 is opened, at the same time with feeding of cooling water, the mold bypass on-off valve 45 is again opened to actuate a timer T9. The mold bypass on-off valve 45 is temporarily closed, by which scavenging compressed air is forcibly fed into the mold to discharge a heating medium remaining inside the mold. At a point in time when the heat-medium passage sensor 41 composed of a temperature sensor installed on a supply-side pipe detects the scavenging compressed air or at a point in time when time-up is indicated by the timer T9, the mold bypass on-off valves 45A, 45B are closed. In FIG. 8, the heat-medium passage sensor 41 is shown as a temperature sensor. However, the heat-medium passage sensor 41 may be a pressure sensor. Further, the mold bypass on-off valve 45 may be closed at a point in time when time-up is indicated by the timer T8 which is actuated at the same time when the mold bypass on-off valve 45 is opened. Still further, the scavenging compressed air supply on-off valve 37 is not closed by the timer T5 but may be closed at a point in time when the heat-medium passage sensor 41 detects air.

In FIG. 8, the mold bypass on-off valve 45 is temporarily closed and again opened before the scavenging compressed air is stopped. In order to shorten the time, with the mold bypass on-off valve 45 being not closed temporarily but kept open, a heat medium in a next step may be used to discharge the scavenging compressed air.

Further, in the first embodiment, the timing of closing of the mold bypass on-off valve 45A and mold bypass on-off valve 45B is the same. However, a timer or the like may be used to give a time difference to the mold bypass on-off valves 45A, 45B to conduct opening/closing movements independently, respectively. The mold bypass on-off valves 45A, 45B are closed at a different time, by which even where heat media in a prior step remain in different quantities inside piping different in length from a pipe branching portion of the junction pipe 25 to the cavity side part 2 or the movable side part 3 up to the mold, proper time for discharging respective remaining heat media can be applied independently as the opening time of each of the bypass on-off valves 45A, 45B. Therefore, the heat media in the prior step can be reliably discharged into the discharge pipes 60, 62 through the bypass circuit without passing through the respective molds.

In the cooling step, opening/closing timing of the mold bypass on-off valves 45A, 45B as well as the opening/closing timing of the on-off valve 47 of the discharge-side junction pipe 25B are carried out at the following timing. After the cooling water supply on-off valve 38 for a cooling medium is opened, by a signal detected for the cooling medium by the heat-medium passage sensor 41 or time-up which is indicated by the timer T9, the mold bypass on-off valves 45A, 45B are closed to block the mold bypass pipes 21A, 21B. At the same time with closing of the steam supply on-off valve 36, a timer T19 is actuated, by a signal counted up by the timer T19, the on-off valve 47 is opened to directly connect the discharge-side junction pipe 25B with the cooling water discharge pipe 24B. The timer T19 sets such time that a heating medium flowing from the discharge pipe 46 to the mixer 30 is estimated to be lower in temperature to a level at which no problem will occur if the heating medium is directly discharged into the cooling water discharge pipe 24B via the on-off valve 47. In addition, at a timing when time-up is indicated by the timer T19, the on-off valve 47 is opened to accelerate circulation of cooling water in the nestings 4, 5.

At a point in time when a next standby step is started after termination of the cooling step of the mold, cooling water is discharged as follows from the supply pipe and the heat medium channel inside the mold. That is, when one of the temperature sensors 42a and 42 of the nestings 4, 5 or both of them detect that a temperature of the mold reaches a preset cooling lower-limit temperature TMC, the cooling water supply on-off valve 38 is closed to stop supply of the cooling water and a mold heat-medium switching delay timer T11 is actuated. At a point in time when time-up is indicated by the timer T11, the mold bypass on-off valves 45A, 45B are opened to make the mold bypass pipes 21A, 21B passable, and the scavenging compressed air supply on-off valve 37 is opened to discharge the cooling medium (cooling water) inside the supply-side junction pipe 25A into the discharge-side junction pipe 25B. At the same time with opening of the scavenging compressed air supply on-off valve 37, a timer T12 is actuated which is set in estimation of complete discharge of the cooling water inside the supply pipe. By the time-up which is indicated by the timer T12, the mold bypass on-off valves 45A, 45B are temporarily closed to close the mold bypass pipes 21A, 21B. In addition, a timer T14 which is set in estimation of complete discharge of the cooling water inside the nestings 4, 5 into the discharge-side junction pipe 25B is used to stop supply of scavenging compressed air.

At the same time with time-up which is indicated by the timer T14, a heating start delay timer T17 is actuated. At the same time when the steam supply on-off valve 36 is opened by a time-up signal which is indicated by the timer T17 and steam is fed, the mold bypass on-off valve 45 is again opened. Thereby, scavenging compressed air is discharged by allowing the scavenging compressed air to pass the mold bypass circuit. After elapse of the time set by the timer T13, the mold bypass on-off valve 45 is blocked.

At a point in time when the heating step of the mold is started after termination of the standby step, timing of passing steam into the mixer 30 is adjusted by using the timer T17 from complete discharge of cooling water inside the mold to start of a next heating step of the mold. At the mixer 30, steam is condensed into water and drained, or the water is recovered in the cooling equipment 18 such as a cooling tower or in the boiler 17. For a certain period of time after start of supplying steam, the steam is condensed inside piping or in the mold. Therefore, it takes time before high-temperature steam reaches the discharge pipe. In the meantime, since a heat medium discharged from the mold into the discharge-side junction pipe 25B is lower in temperature, the on-off valve 47 may be opened. Further, the mold bypass on-off valves 45A, 45B may be opened for a short period of time at the start of supplying steam to accelerate flow of steam into the mold.

Cooling water is supplied to the mixer 30 at the following timing. That is, the cooling water may be supplied from the coupling pipe 44 to the mixer 30 constantly, with the on-off valve 51 kept open. It is, however, acceptable that in order to reduce usage of cooling water, the on-off valve 51 is opened to supply the cooling water only when a high temperature is found by using the temperature sensor 42b (T5) which detects a temperature of the mixer 30 of itself or a temperature inside the mixer 30. It is also acceptable that the cooling water is supplied by opening the on-off valve 51 when a temperature equal to or higher than a set temperature is found by the heat-medium passage sensor 43 (T2) which detects a temperature inside the discharge-side junction pipe 25B.

The timer T5 sets time when scavenging compressed air is fed between high-temperature steam supplied in a prior step and cooling water supplied in a next step. In the heating step, the timer T5 is actuated by time-up which is indicated by the timer T3 which is actuated at a point in time when a mold temperature reaches a mold preset upper-limit temperature TMS which is a target temperature on heating or a signal corresponding to progress of injection steps. As the signal corresponding to progress of an injection step, there may be used an injection start signal which is sent from a control device of an injection molding machine main-body or an external signal which is a time-up signal which is indicated by a timer of preset pressure-holding time or the like. At the same time when the timer T5 is actuated, the scavenging compressed air supply on-off valve 37 and the mold bypass on-off valves 45A, 45B are opened to discharge steam, that is, a heat medium in a prior step remaining inside the supply pipe, into the discharge pipes 60, 62 without passing through the mold. Thereby, the mold is prevented from being excessively heated to a temperature in excess of a target temperature on completion of heating. A major purpose of supplying scavenging compressed air is to prevent shock or vibration caused by direct contact of a heating medium with a cooling medium inside piping or the mold. The scavenging compressed air supply on-off valve 37 is closed at the same time with time-up which is indicated by the timer T5. It is also acceptable that the scavenging compressed air supply on-off valve 37 is closed not by the timer T5 but closed at the point in time of detection of air by the heat-medium passage sensor 41.

The timer T7 sets timing of starting the cooling step. The timing is started at the same time with closing of the scavenging compressed air supply on-off valve 37 after termination of the heating step. In addition, the cooling water supply on-off valve 38 is opened by time-up which is indicated by the timer T7. Where a signal corresponding to progress of injection steps by setting of cooling start timing, the external signal may be used to start cooling without using the timer T7. As with the timer T5, as the signal corresponding to progress of injection steps, there may be used an injection start signal which is sent from a control device of an injection molding machine main body or an external signal such as a time-up signal which is indicated by a timer of preset pressure-holding time or the like.

The timer T12 sets bypass passage time of scavenging compressed air after termination of the cooling step. At a point in time when time-up is indicated by the timer T11 which is actuated when a temperature of the mold reaches a target cooling lower-limit temperature TMC in the cooling step, the timer T12 is actuated. That is, at the same time with actuation of the timer T11, the cooling water supply on-off valve 38 is closed, and together with time-up which is indicated by the timer T11, the scavenging compressed air supply on-off valve 37 and the mold bypass on-off valves 45A, 45B are opened. Cooling water remaining inside the supply-side piping in which the scavenging compressed air is substantially discharged into the discharge pipes 60, 62 via the mold bypass on-off valves 45A, 45B. It is preferable that the timer T12 sets time when the scavenging compressed air is estimated to reach the vicinity of the mold. At the same time with time-up which is indicated by the timer T12, the mold bypass on-off valves 45A, 45B are closed, by which all scavenging compressed air is sent to the heat medium circuits 4b, 5b of the mold. Therefore, even in a mold having a heat medium circuit which is greater in influx resistance, cooling water remaining inside the mold can be discharged into a discharge pipe during a short period of time. At the same time when discharging the cooling water, the cooling water passing through the mold can be reduced in quantity. It is, therefore, possible to reduce a phenomenon which lowers a temperature of the mold unnecessarily on discharging the cooling water.

Of these two effects, regarding the latter effect, on-off valves 61A, 61B are installed on the sides closer to the mold than positions that connect the mold bypass pipes 21A, 21B which are on the way to the heat-medium supply pipe of the mold and connected to the mold bypass on-off valves 45A, 45B with the supply-side junction pipe 25A. In addition, cooling water is controlled so as not to flow into the heat medium circuit of the mold when the mold bypass on-off valves 45A, 45B are opened, thereby obtaining a greater effect. The mold bypass on-off valves 45A, 45B may be closed not by time-up which is indicated by the timer T12. That is, it is acceptable that there is provided a heat-medium passage sensor (not shown) at a position closer to the valve control unit 19 than positions at which the mold bypass pipes 21A, 21B, which are heat medium supply pipes in the vicinity of the mold and connected to the mold bypass on-off valves 45A, 45B, are connected to the supply-side junction pipe 25A of the heat medium, and the mold bypass on-off valves 45A, 45B are closed by reaching the scavenging compressed air detected by the sensor.

It is preferable that the timer T14 sets such time that is started from a scavenging step until when the mold bypass on-off valves 45A, 45B are opened only for time set by the timer T12, a cooling medium inside the supply-side piping is discharged into the discharge pipe side by bypassing the mold and, thereafter, cooling water remaining in the heat medium circuit inside the mold is estimated to be discharged into the discharge pipe by scavenging compressed air. At the same time when the mold bypass on-off valves 45A, 45B are opened, the timer T14 is actuated. The scavenging compressed air supply on-off valve 37 is closed by time-up which is indicated by the timer T14. The scavenging compressed air supply on-off valve 37 for discharging cooling water from the mold may be closed not by the timer T14. That is, the scavenging compressed air supply on-off valve 37 may be closed by reaching the scavenging compressed air detected by the heat-medium passage sensor 43 on the heat medium discharge pipe which is closer to the mold than the positions at which the mold bypass pipes 21A, 21B connected to the mold bypass on-off valves 45A, 45B are connected to the discharge-side junction pipe 25A of the heat medium.

The timer T17 sets standby time until start of heating the mold. The timer T17 is actuated at the same time when the scavenging compressed air supply on-off valve 37 is closed on discharging a cooling heat medium. A heating step is started by opening the steam supply on-off valve 36 for heating the mold in preparation of next injection movements by time-up which is indicated by the timer T17. The opening of the on-off valve 36 of the heating medium may be set not by the timer T17 but by a signal corresponding to progress of injection steps or a timer or the like mounted on the valve controller unit (mold temperature adjustor) 19 to set an interval of timing for starting the heating step. As the signal corresponding to progress of injection steps, there may be used an injection start signal sent from a control device of an injection molding machine main body, a time-up signal which is indicated by a timer of preset pressure-holding time or the like, or an external signal which indicates completion of taking out a shaped article, for example. Further, prior to starting the heating step, while time-up is indicated by a timer which sets a predetermined time or while a pressure value detected by a pressure sensor installed on the supply pipe or the discharge pipe is below a predetermined value, there may be conducted a remaining pressure releasing step for returning the pressure inside the circuit to a normal level. Release of the pressure remaining inside piping makes it easier to supply steam and further effective in shortening the heating time.

The timer T18 shown in the line drawing of FIG. 8 sets timing of closing movements of the discharge pipe bypass on-off valves 48A, 48B which are positioned between the heat medium discharge pipe of the mold and the mixer 30. The timer T18 is actuated so that the heating step is started at the same time when the steam supply on-off valve 36 is opened. By the time-up which is indicated by the timer T18, the discharge pipe bypass on-off valves 48A, 48B are closed which are positioned on the cavity-side discharge pipe 60 and the movable-side discharge pipe 62. During the first half of the heating step and in a state that the discharge pipe bypass on-off valves 48A, 48B are opened, a heat medium which is discharged from the mold by bypassing the variable flow control valves 49A, 49B is allowed to flow into the mixer 30. Thus, regardless of how much the variable flow control valves 49A, 49B are narrowed, steam can be increased in flow rate. Therefore, as compared with a case where the heating step is conducted during the second half of the heating step, with the discharge pipe bypass on-off valves 48A, 48B kept closed, a large quantity of steam can be supplied to accelerate a rise in temperature of the mold.

By the time-up which is indicated by the timer T18, the discharge pipe bypass on-off valves 48A, 48B are closed, by which steam passing through the variable flow control valves 49A, 49B is increased in pressure. It is, thus, possible to increase a speed of discharging steam at the start of discharging steam to be described later. Further, during the second half of the heating step, steam is increased in pressure to raise a steam temperature. Thus, even where a temperature of the mold is brought closer to a steam temperature to decrease a speed of raising the temperature of the mold, the temperature can be raised to obtain a great speed, as compared with a case where the discharge pipe bypass on-off valves 48A, 48B are opened.

It is preferable that the timer T18 sets such time that is estimated to make shortest the time of reaching a target temperature on heating the mold by a temperature rising curve obtained when the discharge pipe bypass on-off valves 48A, 48B are opened and a temperature rising curve when the discharge pipe bypass on-off valves 48A, 48B are closed. Where the target temperature on heating the mold is sufficiently lower than a temperature of steam supplied from the boiler 17, the timer T18 is disregarded, while the steam supply on-off valve 36 is opened, the discharge pipe bypass on-off valves 48A, 48B are kept closed, and a pressure of steam inside the mold is adjusted by using the variable flow control valves 49A, 49B. It is, thereby, possible to obtain a temperature of the mold which is a target temperature on heating within a substantially equal time for opening and closing the discharge pipe bypass on-off valves 48A, 48B. It is also possible to save time and labor in examining a set value of the timer T18.

It is preferable that the timer T19 shown in the line drawing of FIG. 8 sets such timing that the on-off valve 47 is opened which is positioned between the discharge pipe from the mold and the cooling water discharge pipe 24B leading to the cooling equipment 18 such as a cooling tower. The timer T19 is actuated at a point in time when time-up is indicated by the timer T3 which is actuated at the same time when the steam supply on-off valve 36 is closed. The on-off valve 47 is opened by time-up which is indicated by the timer T19. It is preferable that the timer T19 sets such time that the heat medium which returns to the valve control unit (mold temperature adjustor) 19 from the drain pipe leading from the mold is switched from a heating medium to a cooling medium, thereby, the cooling medium is gradually lowered in temperature at which the cooling medium is estimated so that no problem occurs if directly returned to the cooling equipment 18 such as a cooling tower without passing through the mixer 30. The on-off valve 47 is closed by time-up which is indicated by a timer T20 which is actuated together with opening of the on-off valve 47. The on-off valve 47 in the cooling step of the mold may be opened and closed not by the timers T19, T20 but by a point in time when the heat-medium passage sensor 43 on the drain pipe from the mold is used to detect that a temperature of the heat medium becomes equal to or lower than a predetermined temperature which has been set in advance.

Second Embodiment

A description will be given of the second embodiment with reference to the drawings.

Figure 3:
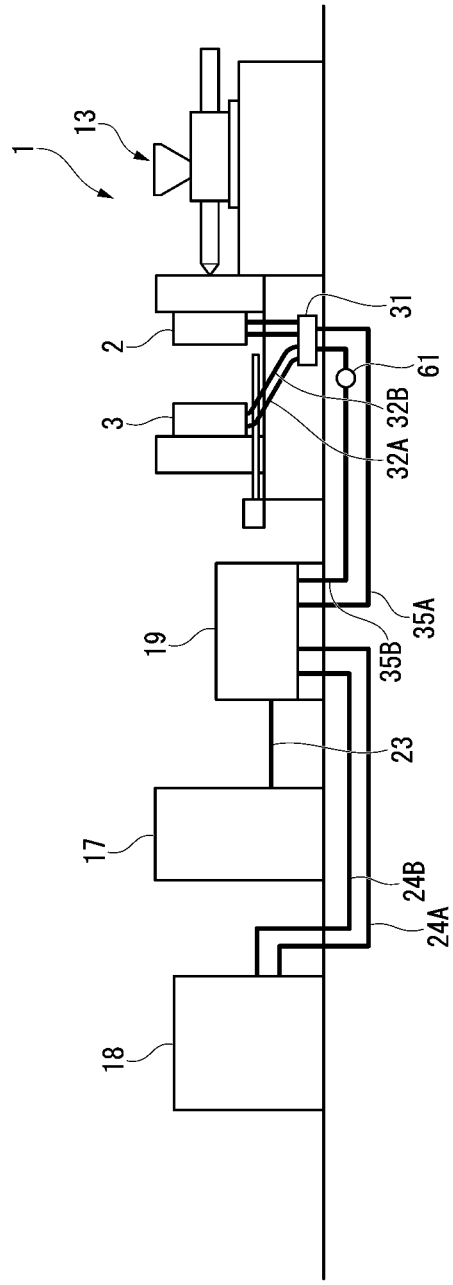
FIG. 3 is a side-face layout chart which shows an injection molding device of a second embodiment.
Figure 9:
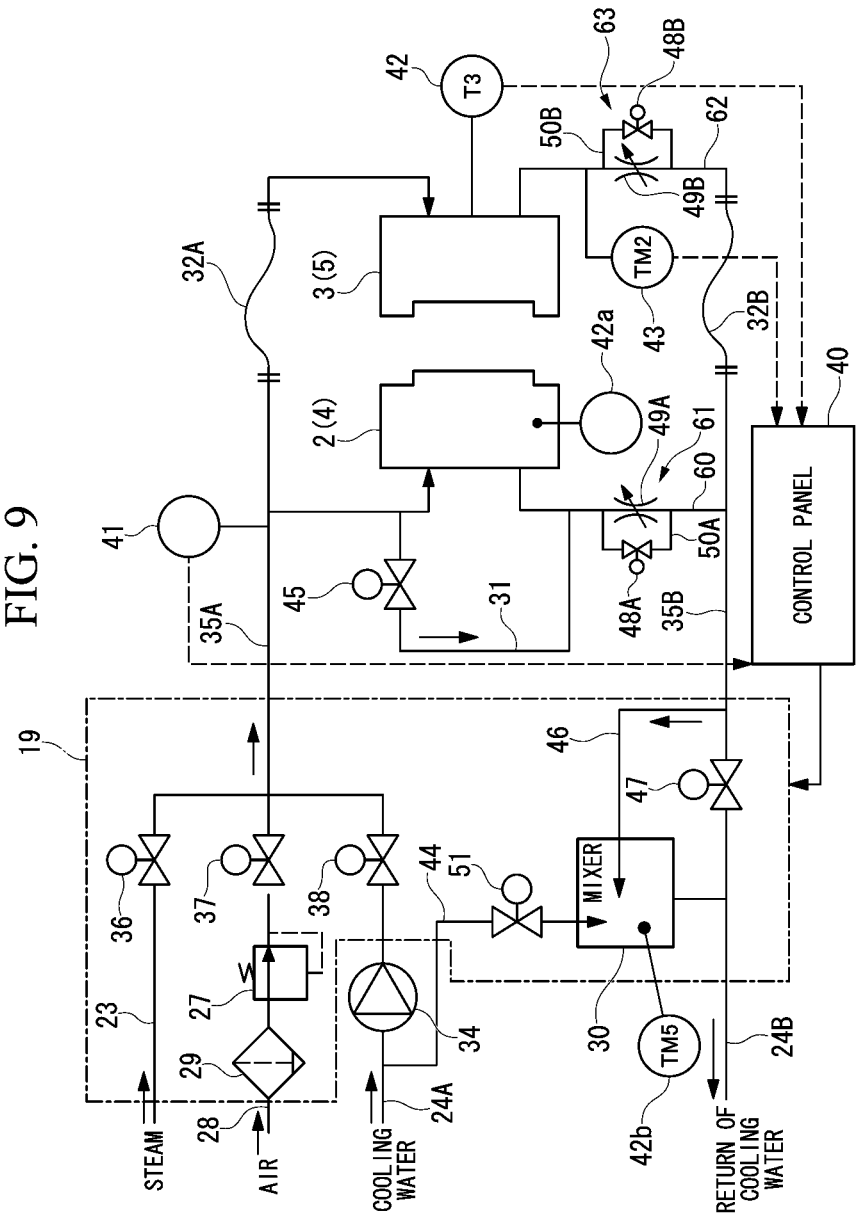
FIG. 9 is a schematic view which shows a mold heating circuit of a second embodiment.

FIG. 3 is a side-face layout chart of an injection molding device in the second embodiment. FIG. 9 is a schematic view which shows a mold heating circuit thereof. The injection molding device of the second embodiment is different from the injection molding device of the first embodiment in a constitution in which bypass piping is installed.

In the side-face layout chart which shows the injection molding device of FIG. 3, steam is sent through a steam supply pipe 23 from a boiler 17 to a valve controller unit (mold temperature adjustor) 19, cooling water is sent through a cooling water supply pipe 24A from cooling equipment 18 such as a cooling tower to the valve controller unit (mold temperature adjustor) 19, and the cooling water discharged from a mold is recovered through a cooling water discharge pipe 24B into the cooling equipment 18 such as a cooling tower. The steam, the cooling water and scavenging compressed air are supplied and discharged through a supply pipe 35A and a discharge pipe 35B from the valve controller unit (mold temperature adjustor) 19 to a nesting 4 of a cavity side part 2.

A mold bypass pipe 31 and a mold bypass on-off valve 45 are installed on one of the cavity side part 2 and a movable side part 3 or in the vicinities of the cavity side part 2 and the movable side part 3 and at positions not far way from them. The mold bypass pipe 31 is connected to an inlet pipe 11a of the nesting 4 of the cavity side part 2 and also coupled to an inlet pipe 11b of a nesting 5 of the movable side part 3 with a flexible pipe 32A. The mold bypass pipe 31 is connected to an outlet pipe 12a of the nesting 4 of the cavity side part 2 and also coupled to an outlet pipe 12b of the nesting 5 of the movable side part 3 with a flexible pipe 32B. The flexible pipe 32A and the flexible pipe 32B correspond to mold opening and closing movement of the movable side part 3. The above arrangement of the mold bypass pipe 31 is advantageous in that the movable side part 3 is short in movement distance on opening the mold and also able to reduce costs. Further, the above arrangement is easily applicable to an existing mold.

Third Embodiment

A description will be given of the third embodiment with reference to the drawings.

Figure 10:
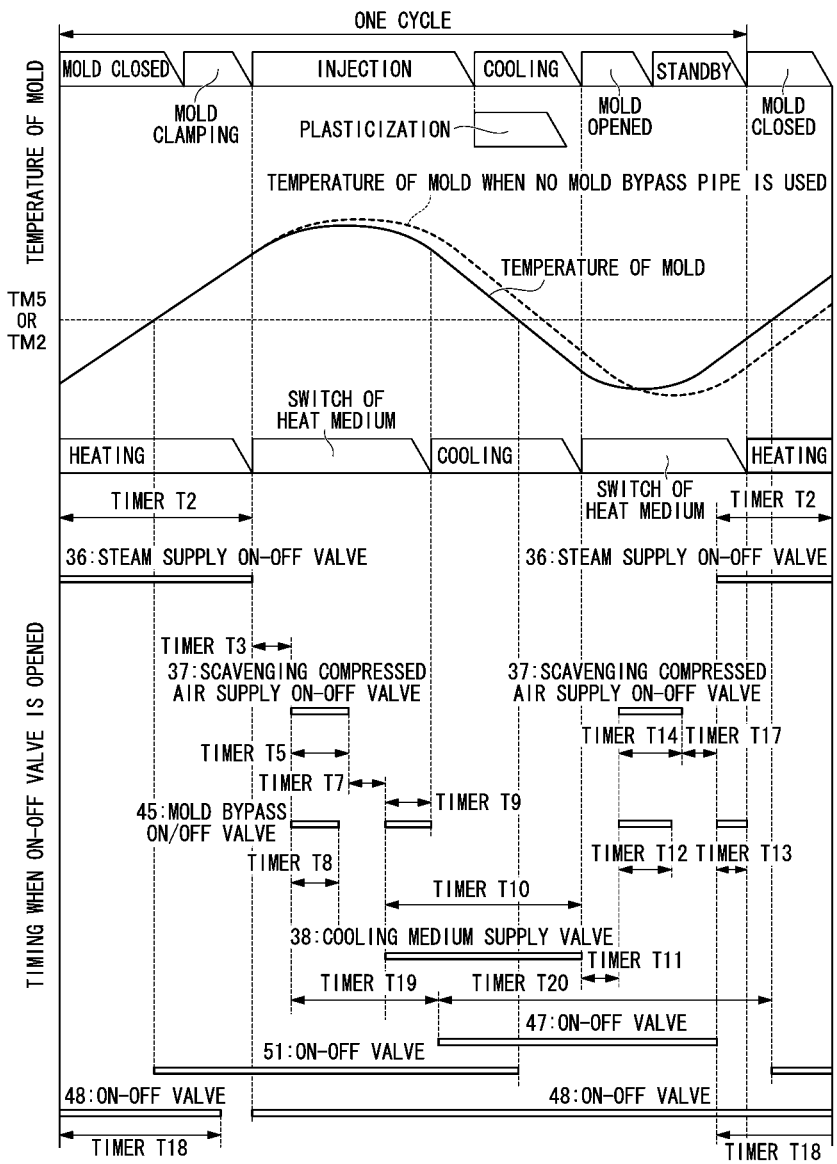
FIG. 10 is a line drawing which shows temperatures of the mold and opening timing of individual on-off valves corresponding to molding steps related to a third embodiment.

FIG. 10 is a line drawing which shows temperatures of the mold and timing of opening/closing individual on-off valves corresponding to molding steps of an injection molding device having the mold heating circuit of FIG. 1. The injection molding device of the third embodiment is different from the injection molding device of the first embodiment only in that in the first embodiment, the heating step is terminated at a point in time when a temperature of the mold reaches a mold preset upper-limit temperature TMS but in the third embodiment, the heating step is terminated at a point in time when time-up is indicated by the timer T2 which is actuated at the start of supplying steam and in the first embodiment, the cooling step is terminated at a point in time when the temperature of the mold reaches a cooling lower-limit temperature TMC but in the third embodiment, the cooling step is terminated at a point in time when time-up is indicated by the timer T10 which is actuated at the start of supplying cooling water. Since other constitutions of the third embodiment are all the same as those of the first embodiment, a description of the same constitutions will be omitted here.

With reference to FIG. 1 and FIG. 10, a description will be given of temperatures of the mold and timings of opening individual on-off valves corresponding to molding steps of the injection molding device. A method for controlling a mold temperature adjusting circuit is that in which in the mold temperature adjusting circuit, a heating step and a cooling step are repeated, during which scavenging compressed air is supplied. In the heating step of the mold, a steam supply on-off valve 36 of a steam supply pipe 23 is opened to supply steam via a supply-side junction pipe 25A to a cavity side part 2 and a movable side part 3. Heating of nestings 4, 5 is started and a timer T2 for terminating the heating is also actuated. At a point in time when time-up is indicated by the timer T2, the steam supply on-off valve 36 is closed to terminate the heating step of the mold.

At a point in time when a cooling step of the mold is started after termination of the heating step of the mold, steam is discharged from a supply pipe. By the time-up which is indicated by a timer T3 which is actuated at the same time when a steam supply on-off valve 36 in a prior step is closed, mold bypass on-off valves 45A, 45B are opened to make mold bypass pipes 21A, 21B passable. Then, a scavenging compressed air supply on-off valve 37 is opened for a short period of time according to the setting of a timer T5, and steam inside a supply-side junction pipe 25A is directly bypassed to a discharge-side junction pipe 25B. Steam, which is low in flow resistance, can be discharged within a very short period of time.

After the time-up is indicated by the timer T5, by a time-up signal which is indicated by a timer T7 for delaying the start of cooling, a cooling water supply on-off valve 38 is opened to send cooling water, thereby starting to cool the mold. A timer T10 which detects completion of cooling is actuated. At a point in time when time-up is indicated by the timer T10, the cooling water supply on-off valve 38 is closed. By the time-up which is indicated by a timer T11 which is actuated at the same time thereof, mold bypass on-off valves 45A, 45B are opened to make mold bypass pipes 21A, 21B passable. Timers T12, T14 are actuated. By the time-up which is indicated by the timer T12, the mold bypass valves 45A, 45B are closed to send scavenging compressed air into the mold, thereby discharging a cooling medium inside the mold. By the time-up which is indicated by the timer T14, a scavenging compressed air supply on-off valve 37 is closed to terminate a scavenging step. The scavenging compressed air supply on-off valve 37 may not be closed by the timer T5 but may be closed at the point in time of detection of air by a heat-medium passage sensor 41.

Termination of the heating step or that of the cooling step is not controlled by a temperature of the mold which may vary easily but controlled by time-up which is indicated by a timer. It is, thereby, possible to carry out molding at constant switch timing. Thus, molding cycle is made stable and effective in producing shaped articles stable in quality and improving the productivity. In the present invention, constitutions described in the embodiments so far described may be freely selected or changed into other constitutions whenever necessary, without departing from the gist of the present invention.

Fourth Embodiment

A description will be given of the fourth embodiment with reference to the drawings.

Figure 11:
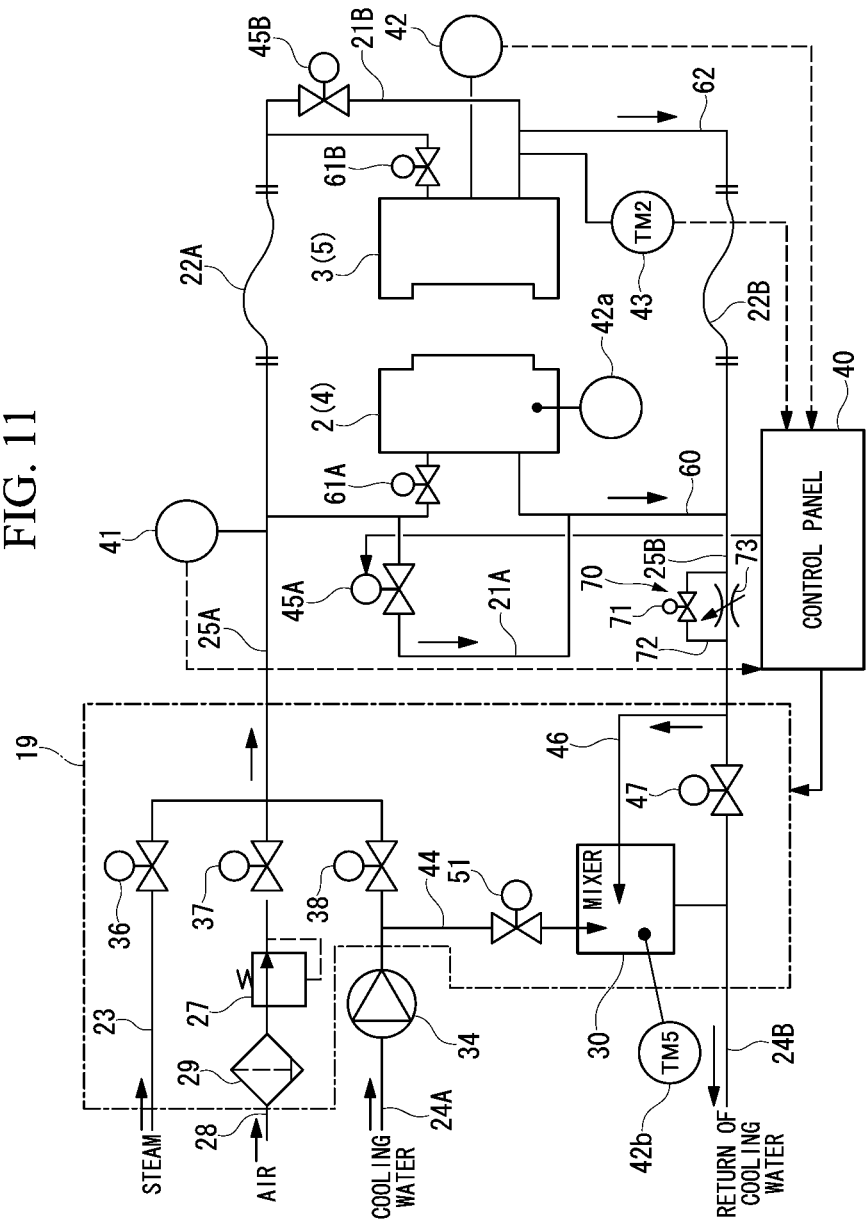
FIG. 11 is a schematic view of a mold heating circuit installed on an injection molding device related to a fourth embodiment.

FIG. 11 is a schematic view which shows a mold heating circuit mounted on an injection molding device of the embodiment of the present invention. The injection molding device of the fourth embodiment is different from the injection molding device of the first embodiment in a position at which a discharge rate adjusting unit is installed. That is, as shown in FIG. 1, in the first embodiment, the cavity-side discharge rate adjusting unit 61 and the movable-side discharge rate adjusting unit 63 are installed respectively on the cavity-side discharge pipe 60 and the movable-side discharge pipe 62. However, in the fourth embodiment, there is installed one discharge rate adjusting unit 70 on a discharge-side junction pipe 25B which is upstream from a valve control unit 19. According to the above-described constitution, a temperature of a cavity side part 2 and that of a movable side part 3 can be controlled at the same time by operating only the discharge rate adjusting unit 70, which is advantageous in easily controlling the temperature of the mold.

The discharge rate adjusting unit 70 is constituted with a discharge pipe bypass on-off valve 71, a variable flow control valve bypass pipe 72 and a variable flow control valve 73. Since the working effect of respective constituents in the present embodiment is the same as that in the first embodiment, a description thereof will be omitted here. Further, since constituents other than the discharge rate adjusting unit 70 are the same as those of the first embodiment, the same reference numerals as those shown in FIG. 1 are given, with a description thereof being omitted here.

INDUSTRIAL APPLICABILITY

In the present injection molding device, a discharge rate adjusting unit which has a variable flow control valve installed on a discharge pipe to change a flow rate of a heat medium is installed at a position upstream from a mold temperature adjustor on the discharge pipe. According to the above-described constitution, during the second half of a heating step of a mold, the discharge pipe in which the heat medium is sealed is shortened in pipe length. Therefore, the heat medium is lower in fluid pressure loss and also small in heat release quantity from the discharge pipe to surrounding areas. It is, thus, possible to prevent reduction in the heating rate of the mold, without deteriorating the heating effect of the heat medium.

DESCRIPTION OF REFERENCE NUMERALS

1: Injection molding device
2: Cavity side part
3: Movable side part
4, 5: Nesting
13: Injection unit
17: Boiler
18: Cooling equipment
19: Valve control unit (mold temperature adjustor)
21, 31: Mold bypass pipe
23: Steam supply pipe
24A: Cooling water supply pipe
24B: Cooling water discharge pipe
25A: Supply-side junction pipe (supply pipe)
25B: Discharge-side junction pipe (discharge pipe)
30: Mixer
36: Steam supply on-off valve
37: Scavenging compressed air supply on-off valve
38: Cooling water supply on-off valve
40: Control panel
41, 43: Heat-medium passage sensor
42, 42*a*, 42*b*: Temperature sensor
45: Mold bypass on-off valve
47, 51, 61: On-off valve
48A, 48B: Discharge pipe bypass on-off valve
49A, 49B: Variable flow control valve
50A, 50B: Variable flow control valve bypass pipe
61: Cavity-side discharge rate adjusting unit
63: Movable-side discharge rate adjusting unit
T3, T5, T7, T8, T9, T10: Timer
T11, T12, T14, T17, T18, T19, T20: Timer

What is claimed is:

1. An injection molding device comprising:
   a mold which forms a cavity space for injecting a resin;
   a supply pipe which supplies a heat medium to the mold;
   a discharge pipe which discharges the heat medium from the mold;
   a mold temperature adjustor to which the supply pipe and the discharge pipe are connected to control a flow rate or a pressure of the heat medium, thereby adjusting the temperature of the mold; and
   a discharge rate adjusting unit installed at a position upstream from the mold temperature adjustor on the discharge pipe, wherein the discharge rate adjusting unit comprises:
   a variable flow control valve installed on the discharge pipe to adjust a flow rate of the heat medium;
   a variable flow control valve bypass pipe which bypasses the variable flow control valve and which is communicatively connected to the discharge pipe on an upstream side and a downstream side; and
   a discharge pipe bypass on-off valve installed on the variable flow control valve bypass pipe.

2. The injection molding device according to claim 1, wherein the discharge rate adjusting unit is installed inside an injection molding machine.

3. The injection molding device according to claim 1, wherein
   the discharge rate adjusting unit is installed at a side end of the discharge pipe connected to the mold.

4. The injection molding device according to claim 3, wherein
   the discharge rate adjusting unit is further provided with a steam trap which discharges only a liquid heat medium.

5. The injection molding device according to claim 1, wherein
   the mold is provided with a cavity side part and a movable side part,
   the discharge pipe is branched into a cavity-side discharge pipe connected to the cavity side part and a movable-side discharge pipe connected to the movable side part, and
   the discharge rate adjusting unit is installed on each of the cavity-side discharge pipe and the movable-side discharge pipe in the discharge pipe.

6. The injection molding device according to claim 1, wherein
   the mold is provided with a cavity side part and a movable side part,
   the discharge pipe is provided with a cavity-side discharge pipe connected to the cavity side part, a movable-side discharge pipe connected to the movable side part and a junction pipe at which the cavity-side discharge pipe is joined with the movable-side discharge pipe, and
   the discharge rate adjusting unit is installed on the junction pipe.

7. A method for discharging a heat medium for an injection molding device, wherein
   in the injection molding device according to claim 1,
   at the same time when supply of a heat medium in a prior step is stopped, a heat-medium switching delay timer is actuated, by time-up which is indicated by the heat-medium switching delay timer or a signal of starting supply of a heat medium in a subsequent step corresponding to progress of injection steps, supply of the heat medium in the subsequent step is started, a mold bypass circuit is opened which has a mold bypass pipe which bypasses the mold to couple a supply-side junction pipe of the heat medium to a discharge-side junction pipe thereof and a mold bypass on-off valve installed on the mold bypass pipe, a mold bypass circuit-blocking delay timer is actuated, at a point in time when the mold bypass circuit-blocking delay timer indicates that time is up or at a point in time when a heat-medium passage sensor installed at a mold supply-side piping detects a heat medium in a next step, the mold bypass pipe is blocked.

8. The method for discharging a heat medium for the injection molding device according to claim 7, wherein
supply of a heat medium in a prior step is stopped by time-up which is indicated by a timer which is actuated from start of supplying the heat medium in the prior step and/or at a point in time when the temperature of the mold reaches a predetermined temperature.

9. The method for discharging a heat medium for the injection molding device according to claim 7, wherein
the heat medium in a prior step is a heating medium, and the heat medium in a subsequent step is a cooling medium.

10. The method for discharging a heat medium for the injection molding device according to claim 7, wherein
the heat medium in a prior step is a cooling medium, and the heat medium in a subsequent step is a heating medium.

11. A method for discharging a heat medium for an injection molding device, wherein
in the injection molding device according to claim 1,
at the same time when supply of a heating medium is stopped, a heat-medium switching delay timer is actuated, by time-up which is indicated by the heat-medium switching delay timer or a heat-medium switching start signal corresponding to progress of injection steps, supply of scavenging compressed air is started, the mold bypass circuit is opened, a mold bypass circuit blocking delay timer is actuated, at a point in time when time-up is indicated by the mold bypass circuit blocking delay timer or a point in time when a heat-medium passage sensor installed at the mold supply-side piping detects the scavenging compressed air, the mold bypass circuit is blocked, and at the same time, a delay timer for stopping supply of the scavenging compressed air is actuated, at a point in time when time-up is indicated by the delay timer for stopping supply of the scavenging compressed air or at a point in time when the heat-medium passage sensor installed at the mold discharge-side piping detects the scavenging compressed air, supply of the scavenging compressed air is stopped.

12. A method for discharging a heat medium for an injection molding device, wherein
in the injection molding device according to claim 1,
at the same time when supply of a heating medium is stopped, a heat-medium switching delay timer is actuated, by time-up which is indicated by the heat-medium switching delay timer or a heat medium switching start signal corresponding to progress of injection steps, supply of scavenging compressed air is started, the mold bypass circuit is opened, and a delay timer for stopping supply of the scavenging compressed air is started, at a point in time when time-up is indicated by the delay timer for stopping supply of the scavenging compressed air or at a point in time when a heat-medium passage sensor installed at the mold supply-side piping detects the scavenging compressed air, supply of the scavenging compressed air is stopped, and a cooling operation start delay timer is actuated, by time-up which is indicated by the cooling operation start delay timer or a cooling start signal corresponding to progress of injection steps, supply of a cooling medium is started and the mold bypass circuit blocking delay timer is actuated, at a point in time when time-up is indicated by the mold bypass circuit blocking delay timer or at a point in time when the heat-medium passage sensor installed on the mold supply-side piping detects the cooling medium, the mold bypass circuit is blocked.

13. The method for discharging a heat medium for an injection molding device according to claim 11, wherein
supply of a heating medium is stopped by time-up which is indicated by a timer which is actuated from start of supplying the heating medium and/or at a point in time when the temperature of the mold reaches a predetermined temperature.

14. A method for discharging a heat medium for an injection molding device, wherein
in the injection molding device according to claim 1,
at the same time when supply of a cooling medium is stopped, a heat-medium switching delay timer is actuated, by time-up which is indicated by the heat-medium switching delay timer or a heat medium switching start signal corresponding to progress of injection steps, supply of scavenging compressed air is started and the mold bypass circuit is opened, at a point in time when time-up is indicated by a predetermined timer or a point in time when the heat-medium passage sensor installed at the mold supply-side piping detects the scavenging compressed air, the mold bypass circuit is blocked, and at a point in time when time-up is indicated by the predetermined timer or at a point in time when the heat-medium passage sensor installed at the mold discharge-side piping detects the scavenging compressed air, supply of the scavenging compressed air is stopped.

15. A method for discharging a heat medium for an injection molding device, wherein
in the injection molding device according to claim 1,
at the same time with termination of a cooling step, a heat-medium switching delay timer is actuated, by time-up which is indicated by the heat-medium switching delay timer or a heat-medium switching start signal corresponding to progress of injection steps, supply of scavenging compressed air is started and the mold bypass circuit is opened, at a point in time when time-up is indicated by a predetermined timer or at a point in time when a heat-medium passage sensor installed at a mold supply-side piping detects the scavenging compressed air, supply of the scavenging compressed air is stopped and a heating operation start delay timer is actuated, by time-up which is indicated by the heating operation start delay timer or a heating start signal corresponding to progress of injection steps, heating operation is started, at a point in time when time-up is indicated by the predetermined timer or at a point in time when the heat-medium passage sensor installed at the mold supply-side piping detects a heating medium, the mold bypass circuit is blocked.

16. The method for discharging a heat medium for an injection molding device according to claim 14, wherein
supply of the cooling medium is stopped by time-up which is indicated by a timer which is actuated from the start of supplying the cooling medium and/or at a point in time when a temperature of the mold reaches a predetermined temperature.

17. A method for discharging a heat medium for an injection molding device, wherein
in the injection molding device according to claim 1,
in a heating step, during the first half of heating, the discharge pipe bypass on-off valve is opened which is installed on the variable flow control valve bypass pipe which bypasses the variable flow control valve, and during the second half of heating, the discharge pipe bypass on-off valve is closed, a heating medium is adjusted for a flow rate and a pressure by using the variable flow control valve, and the pressure of the heating medium on termination of heating is made higher than the pressure thereof during the first half of heating.

18. A method for discharging a heat medium for an injection molding device, wherein
in the injection molding device according to claim 1,
while a heat medium which enters into a mixer from a heat-medium discharge pipe leading from the mold is high in temperature, a discharge pipe bypass on-off valve installed on the variable flow control valve bypass pipe is opened, a heat-medium discharge valve is closed which connects the discharge pipe leading from the mold with a return pipe to external cooling equipment, thereby the heat medium is introduced into the mixer, and while the heat medium which enters from the discharge pipe into the mixer is not high in temperature, a heat medium discharge valve is opened which connects the discharge pipe leading from the mold with the return pipe to the external cooling equipment, thereby the heat medium discharged from the mold through the discharge pipe is discharged into the external cooling equipment.

19. An injection molding device comprising:
a mold which forms a cavity space for injecting a resin;
a supply pipe which supplies a heat medium to the mold;
a discharge pipe which discharges the heat medium from the mold;
a mold temperature adjustor to which the supply pipe and the discharge pipe are connected to control a flow rate or a pressure of the heat medium, thereby adjusting the temperature of the mold; and
a discharge rate adjusting unit installed at a side end of the discharge pipe connected to the mold along with being at a position upstream from the mold temperature adjustor on the discharge pipe, wherein the discharge rate adjusting unit comprises:
a variable flow control valve installed on the discharge pipe to adjust a flow rate of the heat medium; and
a steam trap which discharges only a liquid heat medium.

* * * * *